(12) United States Patent
Chandersekaran et al.

(10) Patent No.: US 6,335,972 B1
(45) Date of Patent: Jan. 1, 2002

(54) FRAMEWORK-BASED CRYPTOGRAPHIC KEY RECOVERY SYSTEM

(75) Inventors: Sekar Chandersekaran, Potomac; Sarbari Gupta, Rockville, both of MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/971,204

(22) Filed: Nov. 14, 1997

Related U.S. Application Data
(60) Provisional application No. 60/047,499, filed on May 23, 1997.

(51) Int. Cl.$^7$ ................................................. H04L 9/32
(52) U.S. Cl. ..................................................... 380/286
(58) Field of Search ............................. 380/21, 25, 23, 380/24, 30, 286, 277

(56) References Cited

U.S. PATENT DOCUMENTS

| | | | |
|---|---|---|---|
| 4,802,758 A | 2/1989 | Fabbiani | 356/71 |
| 4,868,877 A | 9/1989 | Fischer | 380/25 |
| 5,005,200 A | 4/1991 | Fischer | 380/30 |
| 5,210,795 A | 5/1993 | Lipner et al. | 380/23 |
| 5,276,737 A | 1/1994 | Micali | 380/30 |
| 5,315,658 A | 5/1994 | Micali | 380/30 |
| 5,315,703 A | 5/1994 | Matheny et al. | 395/507 |
| 5,367,633 A | 11/1994 | Matheny et al. | 395/514 |
| 5,369,766 A | 11/1994 | Nakano et al. | 709/305 |
| 5,379,430 A | 1/1995 | Nguyen | 707/3 |
| 5,388,264 A | 2/1995 | Tobias, II et al. | 707/103 |
| 5,390,325 A | 2/1995 | Miller | 714/38 |
| 5,396,626 A | 3/1995 | Nguyen | 395/701 |

(List continued on next page.)

FOREIGN PATENT DOCUMENTS

| | | |
|---|---|---|
| EP | 0 619 544 | 10/1994 |
| WO | WO 94/15281 | 7/1994 |
| WO | WO 94/15282 | 7/1994 |
| WO | WO 94/15286 | 7/1994 |
| WO | WO 94/19740 | 9/1994 |
| WO | WO 94/19751 | 9/1994 |
| WO | WO 94/19752 | 9/1994 |
| WO | WO 94/23364 | 10/1994 |
| WO | WO 95/01610 | 1/1995 |
| WO | WO 95/02219 | 1/1995 |

OTHER PUBLICATIONS

AResults Folder Framework@ DeBinder, J.g. and Jolin, A.T. TDB v37 n24, Feb. 1994, p. 431–432.
APersistent Framework Independent Record/Playback Framework@ Coskun, N. TDB v36 n6A, Jun. 1991, p. 261–264.
AModel View Schema@ Baker, R., Cavendish, C. and Ramos, S. TDB n5, Oct. 1991, p. 309–310.
AOffice Container Class@ Baker, R., Cavendish, C. and Ramos, S. TDB n5, Oct. 1991, p. 309–310.

(List continued on next page.)

*Primary Examiner*—Tod R Swann
*Assistant Examiner*—Mathew Smithers
(74) *Attorney, Agent, or Firm*—Morgan & Finnegan, LLP

(57) ABSTRACT

A Secure Key Management Framework (SKMF) defines an infrastructure for a complete set of cryptographic services augmented with key recovery enablement. There are three major layers—the application layer invokes the SKMF layer, while the SKMF layer invokes the service provider (SP) layer. The application layer code invokes the cryptographic API and key-recovery API supported by the SKMF. Multiple key recovery mechanisms and cryptographic mechanisms can be implemented as service providers that log-in underneath the framework using the well-defined service provider interfaces provided by the framework. The SKMF implements the supported ATP calls by making appropriate invocations of the service provider modules using the SPIs.

15 Claims, 12 Drawing Sheets

U.S. PATENT DOCUMENTS

| | | | |
|---|---|---|---|
| 5,398,336 A | 3/1995 | Tantry et al. | 707/103 |
| 5,404,534 A | 4/1995 | Foss et al. | 709/303 |
| 5,544,302 A | 8/1996 | Nguyen | 395/326 |
| 5,557,346 A | 9/1996 | Lipner et al. | 380/21 |
| 5,581,761 A | 12/1996 | Radia et al. | 395/702 |
| 5,594,869 A | 1/1997 | Hawe et al. | 713/201 |
| 5,594,921 A | 1/1997 | Pettus | 710/11 |
| 5,604,804 A | 2/1997 | Micali | 380/25 |
| 5,621,797 A | 4/1997 | Rosen | 380/24 |
| 5,640,454 A | 6/1997 | Lipner et al. | 380/21 |
| 5,642,419 A | 6/1997 | Rosen | 380/23 |
| 5,651,068 A | 7/1997 | Klemba et al. | 380/25 |
| 5,659,616 A | 8/1997 | Sudia | 380/23 |
| 5,666,416 A | 9/1997 | Micali | 380/23 |
| 5,796,830 A * | 8/1998 | Johnson et al. | 380/21 |
| 5,907,620 A * | 5/1999 | Klemba et al. | 380/25 |
| 5,937,066 A * | 8/1999 | Gennaro et al. | 380/21 |

OTHER PUBLICATIONS

AIcon Pane Class@ Cavendish, C., and Ramos, S. TDB n2 Jul. 1991, p. 118–119.

ADistribution List Class@ Baker, R. and Cavendish, C. and Ramos, S. TDB n1 Jun. 1991, p. 159.

AObject–Oriented Documentation Tool@ Cavendish, C. and Ramos, S. TDB n1 Jun. 1991, p. 50–51.

AObject–Oriented Programming in C—the Linnaeus System@ Allard, J.R. et al., TDB n9b, Feb. 1990, p. 437–439.

ACommon Data Security Architecture Specification@ Release 1.0 Oct. 1996, Copywright 1996 Intel Corporation.

ACommon Security Services Manager Application Programming Interface (API)@ Draft for Release 1.2 Mar. 1997, Copyright 1997 Intel Corporation.

ADefault Organization for Connected Objects,@ IBM Research Disclosure RD349005, May 1983, p. 283.

* cited by examiner

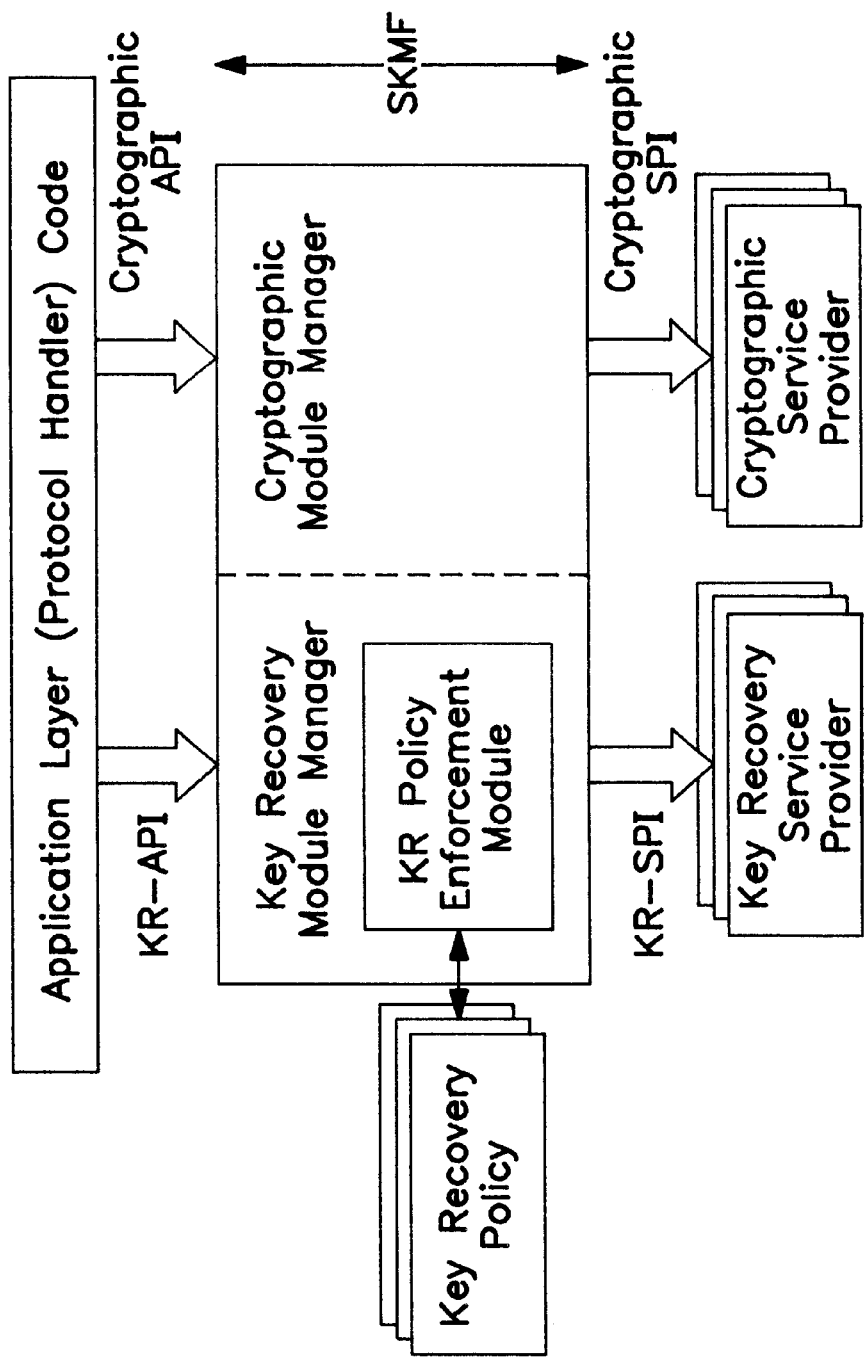
FIG. 1.2

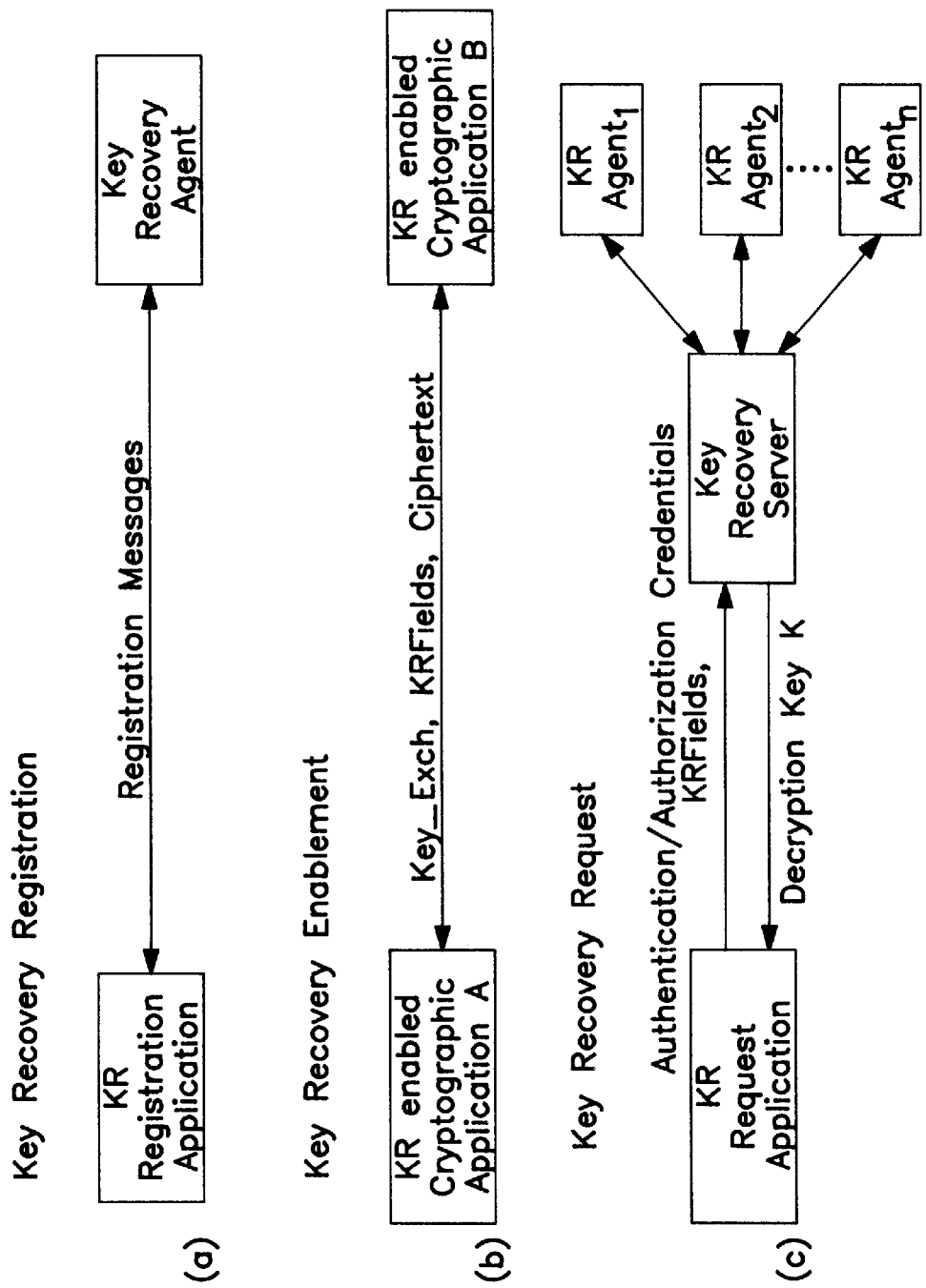
FIG. 2.1

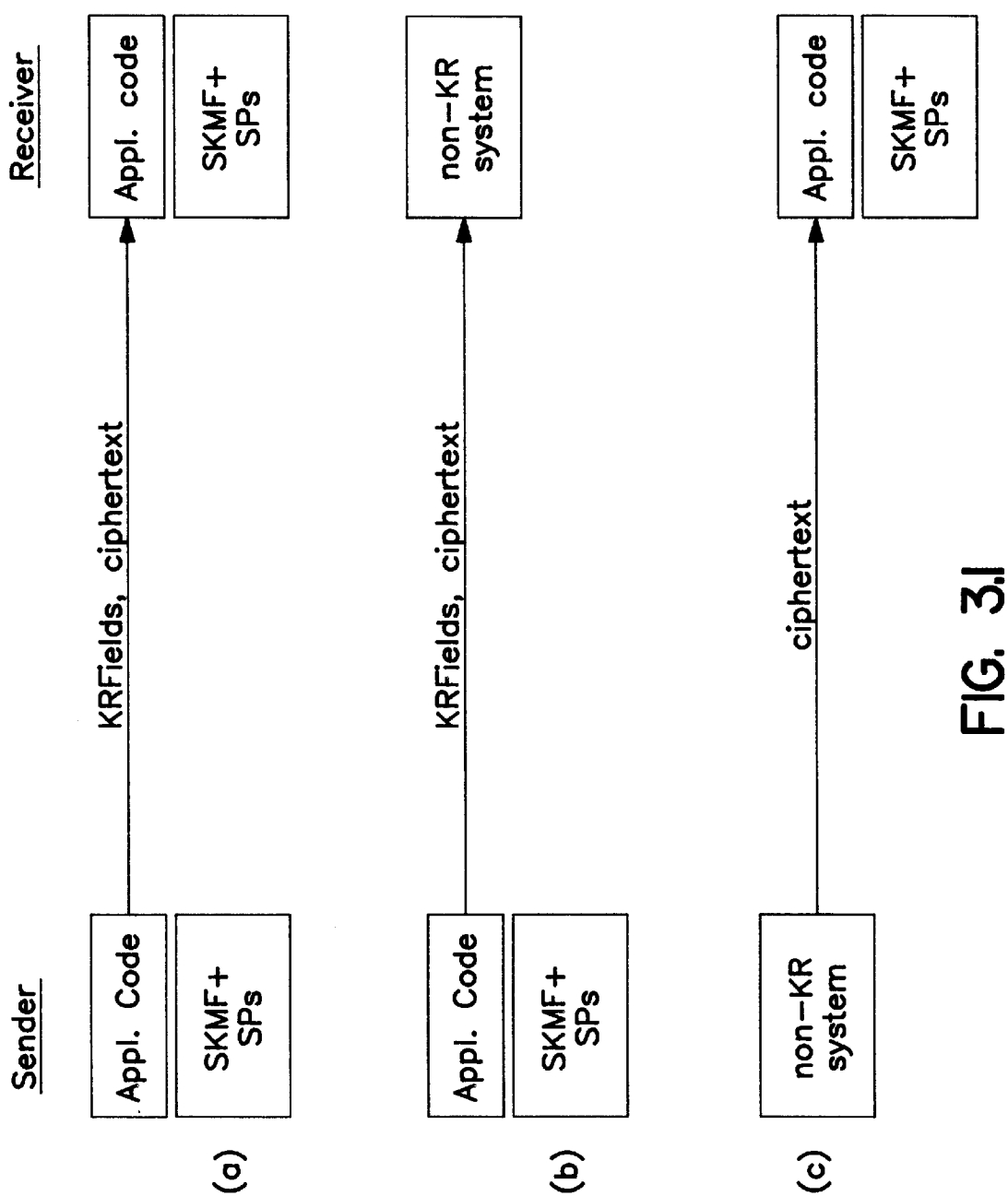
FIG. 3.1

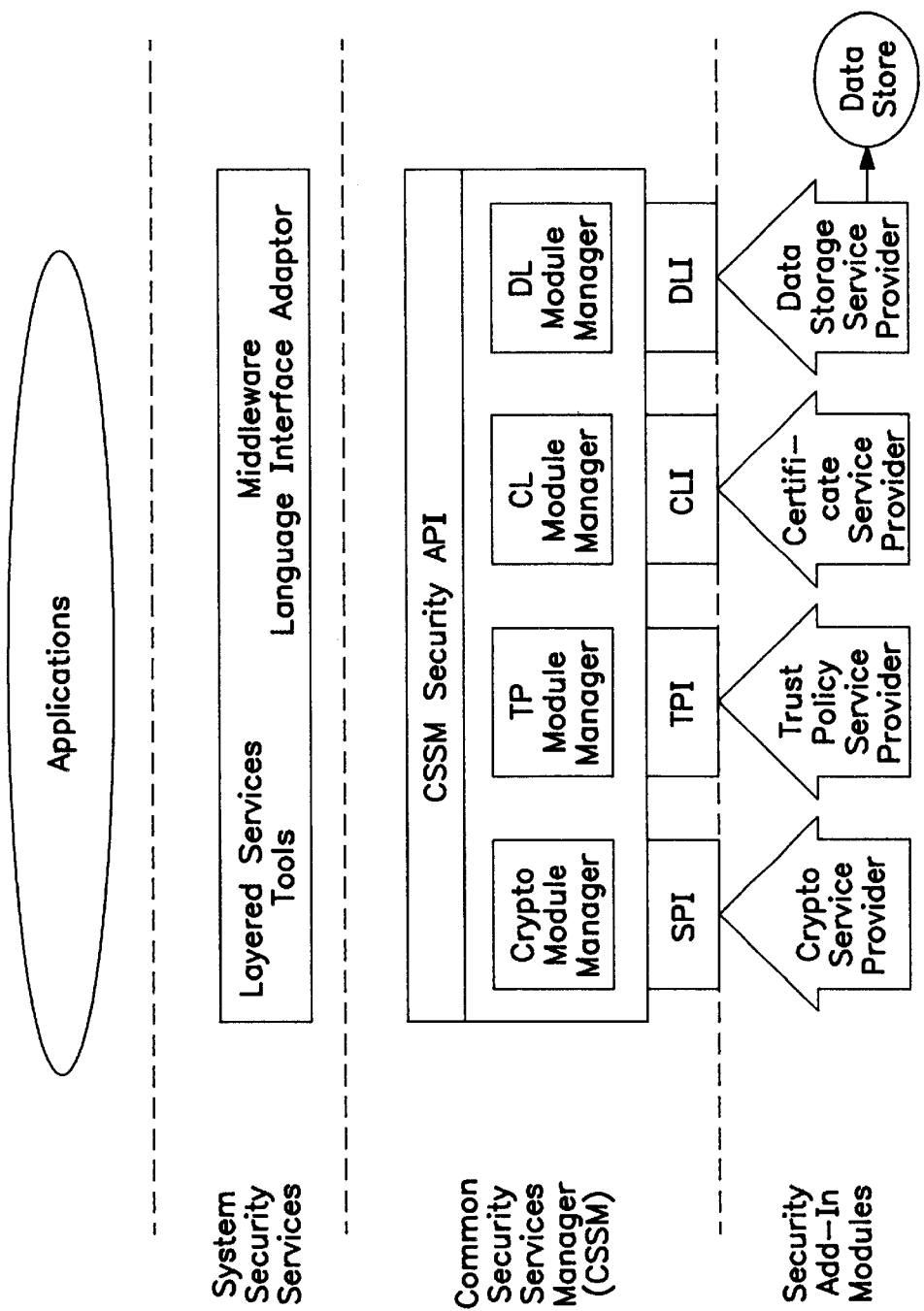
FIG. 4.1

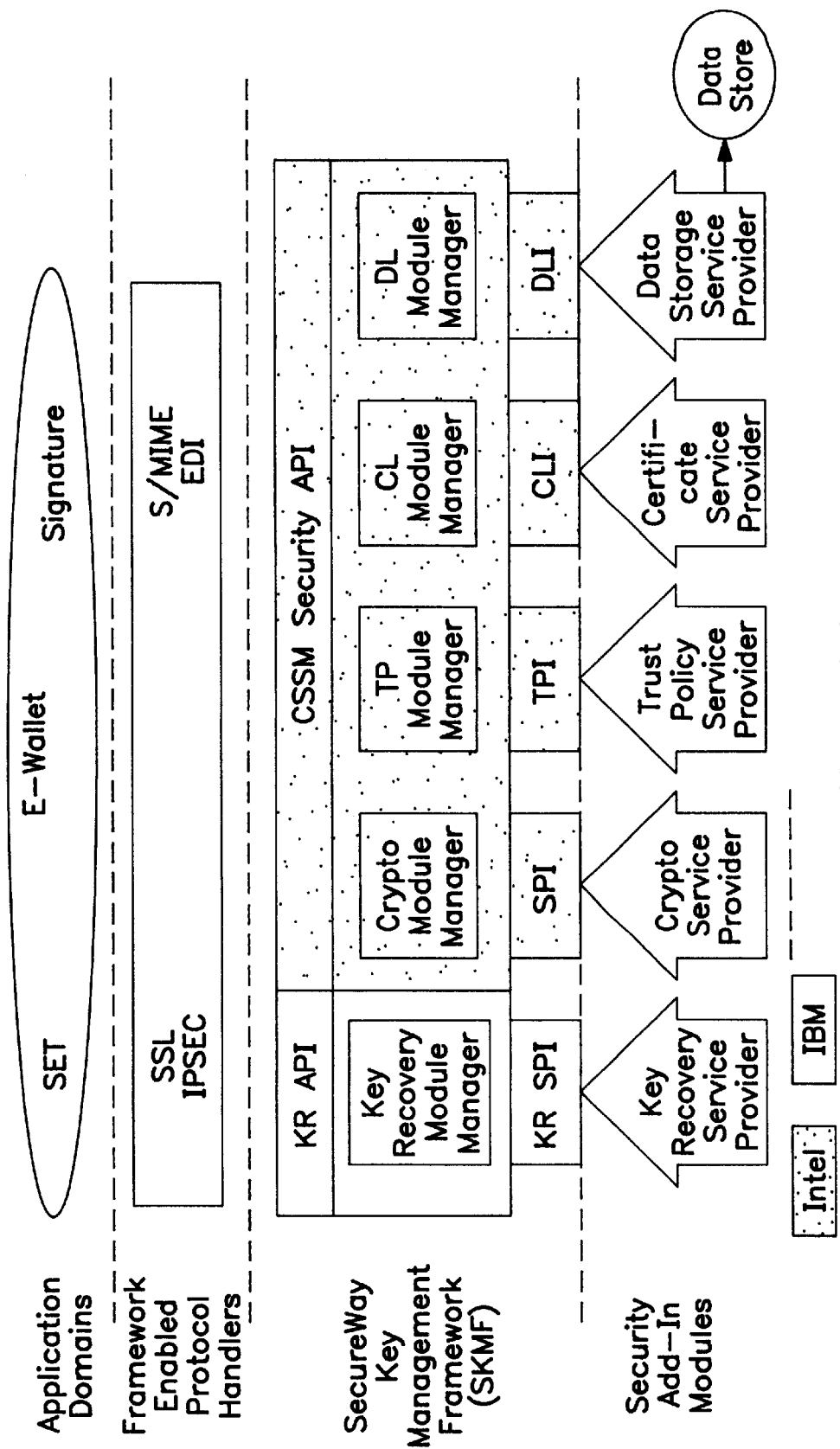
FIG. 4.2

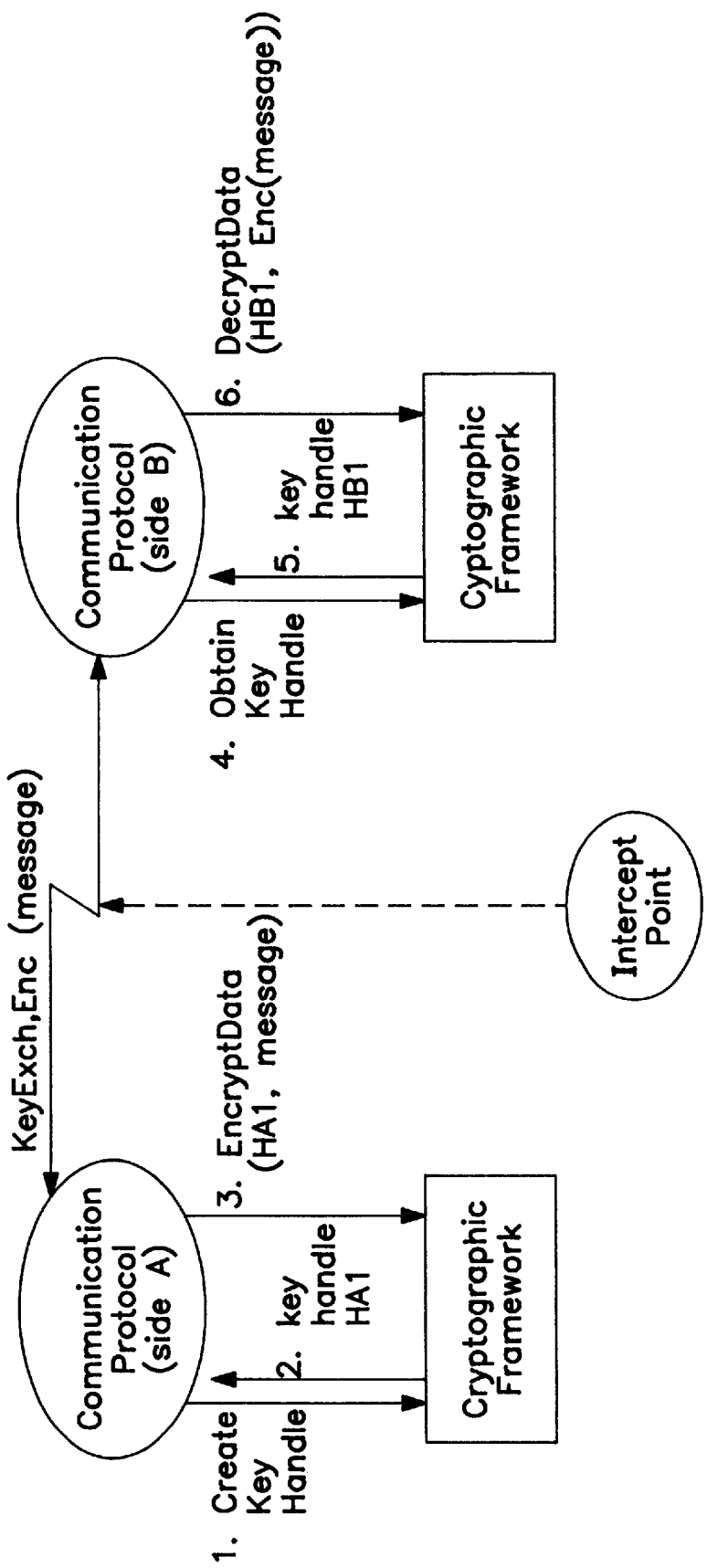
FIG. 4.3

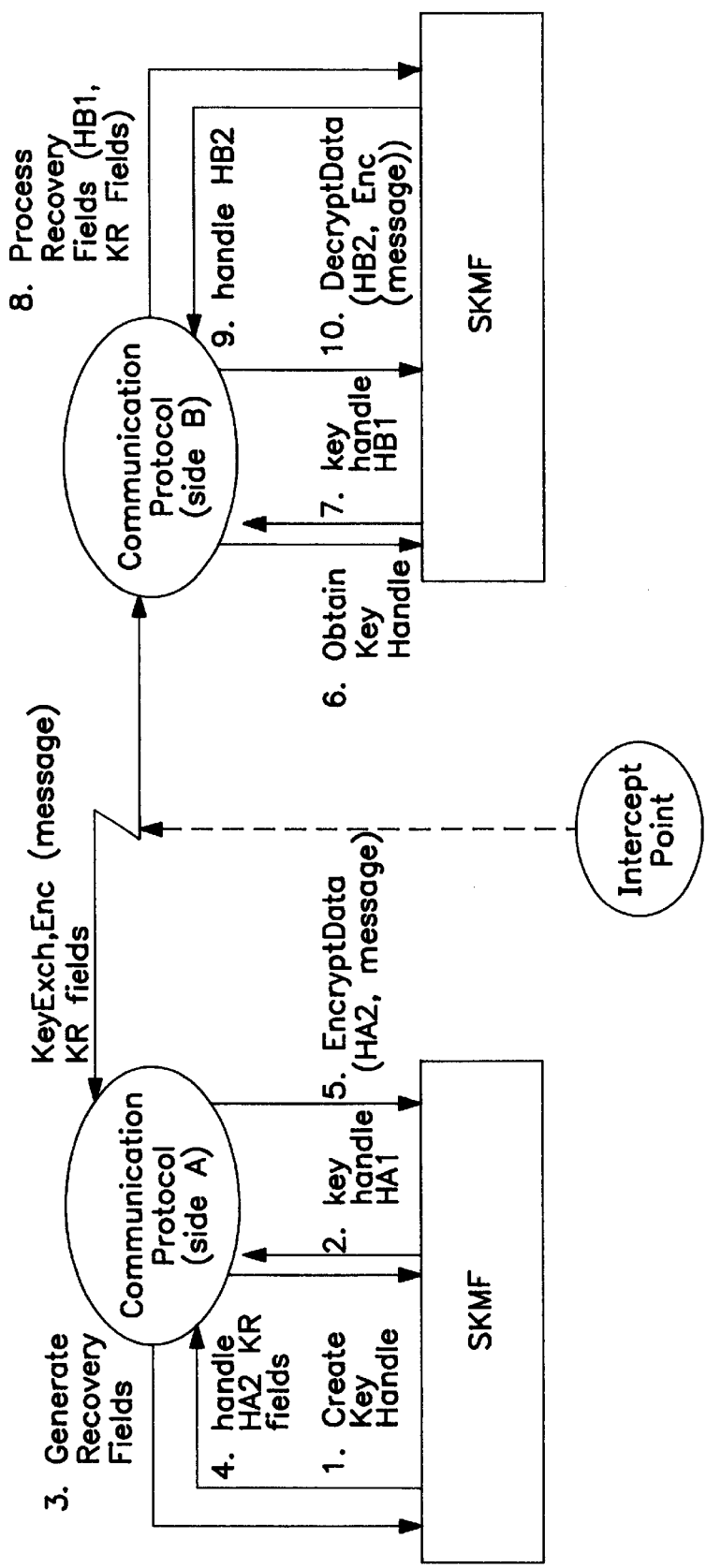
FIG. 4.4

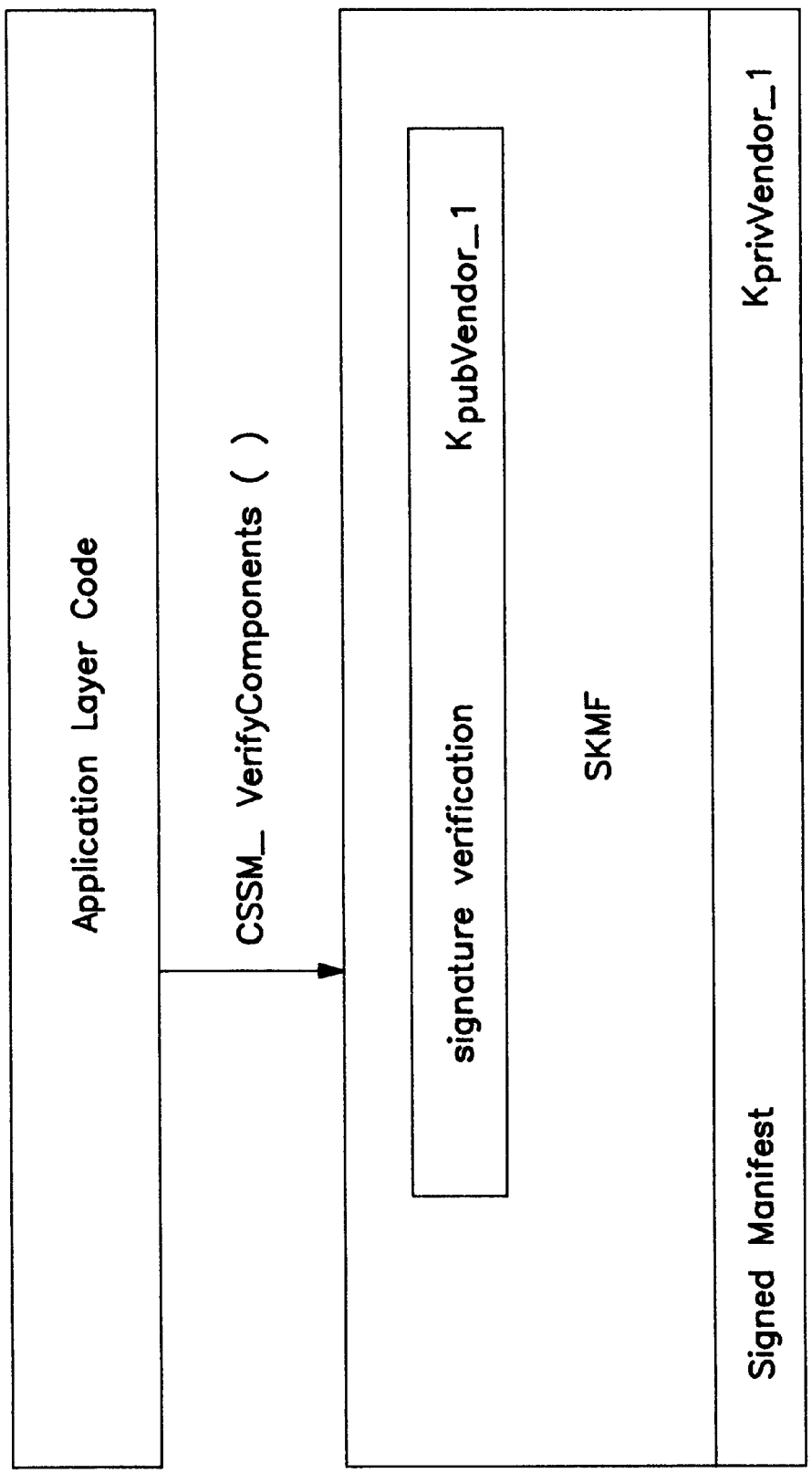
FIG. 5.I

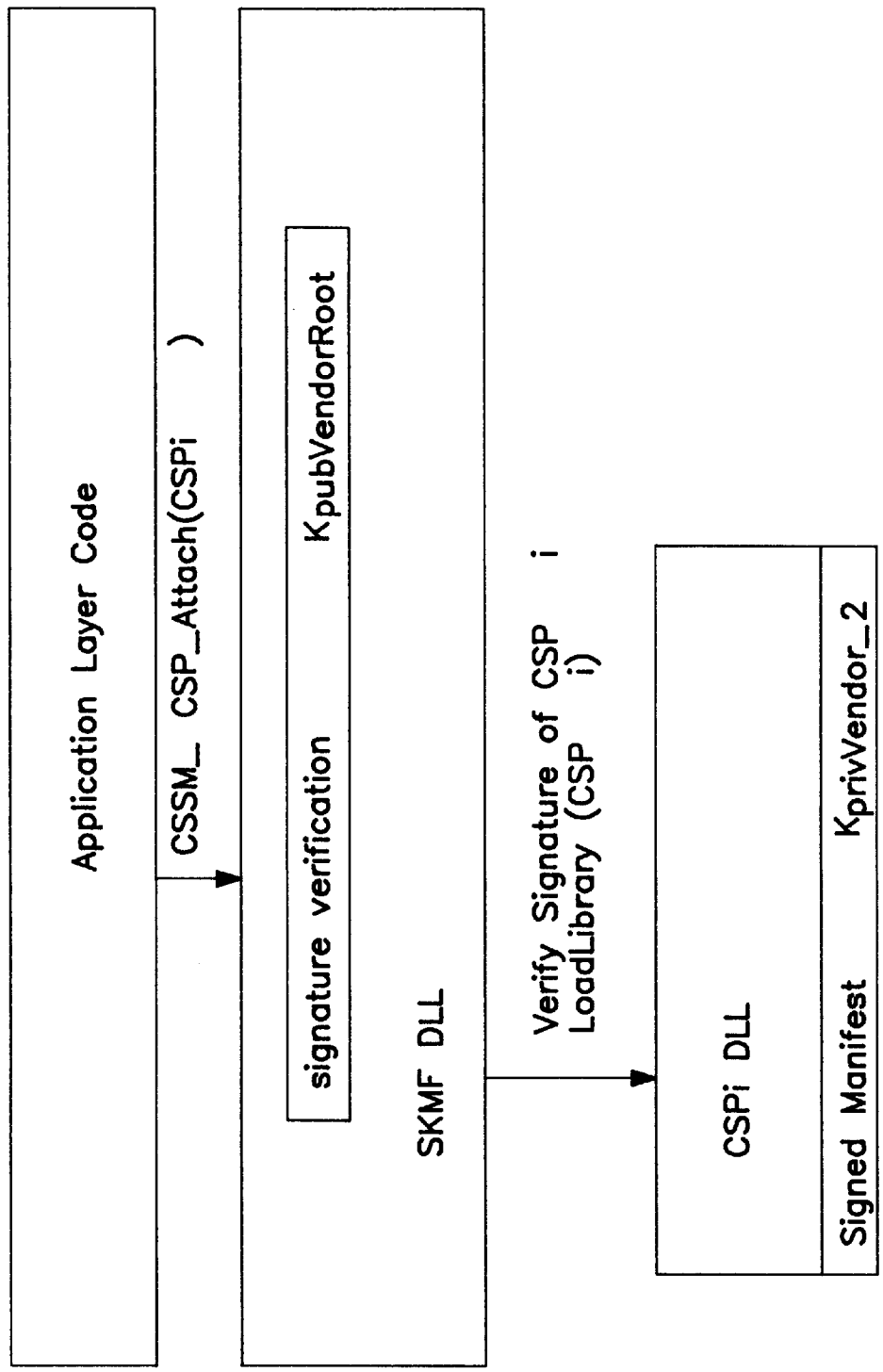
FIG. 5.2

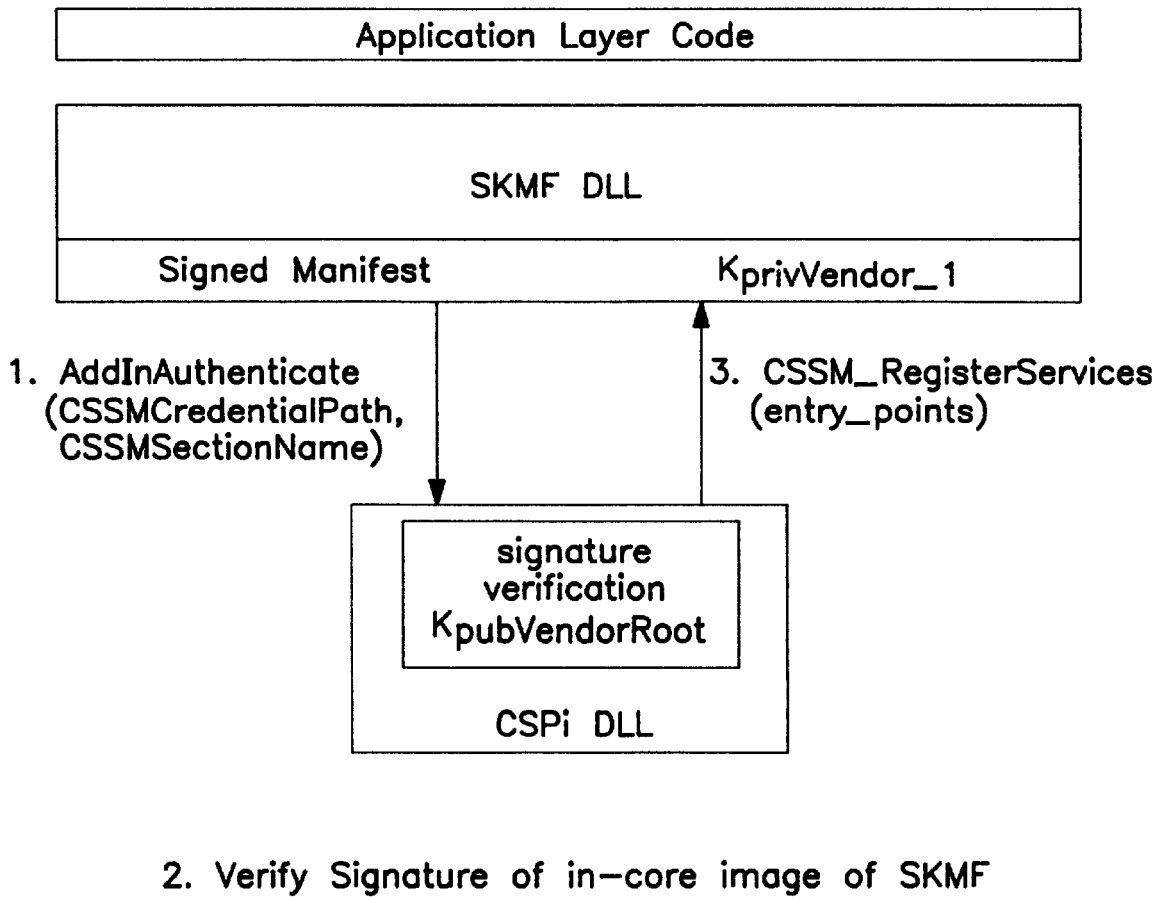
FIG. 5.3

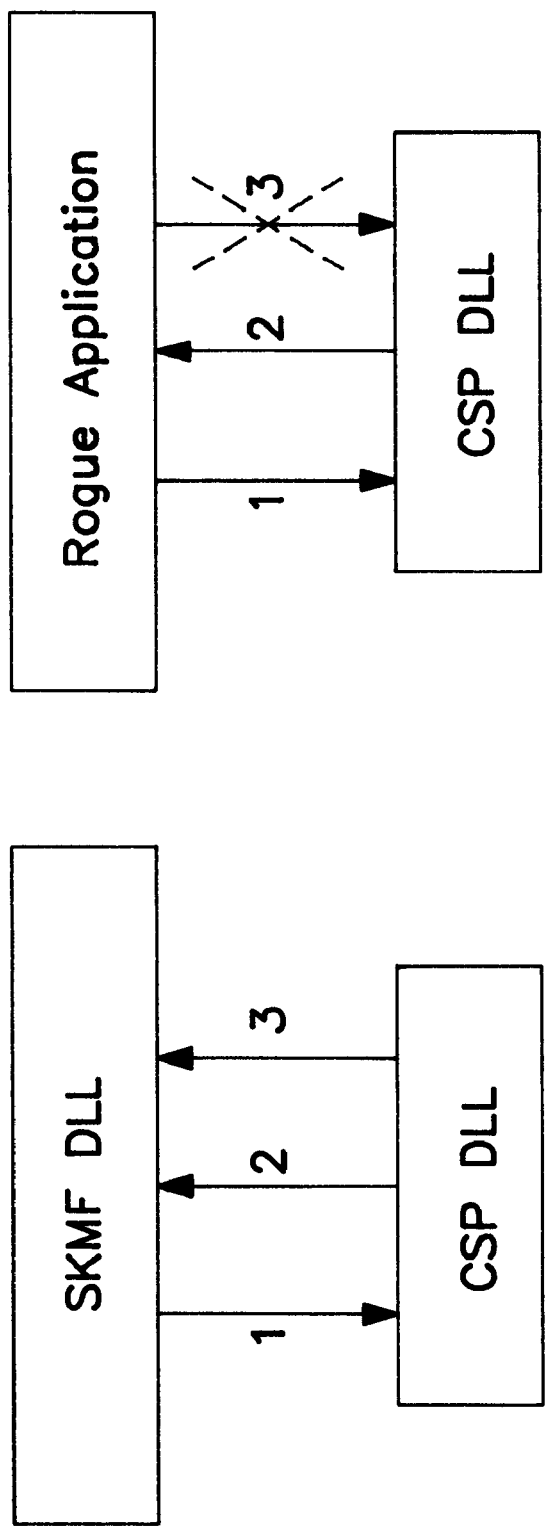
1. LoadLibray("CSP DLL") —No exported interfaces
2. AddInAuthenticate( ) verifies the SKMF
3. CSSM_RegisterServices( ) —registration of CSP entry points
FIG. 5.4

FRAMEWORK-BASED CRYPTOGRAPHIC KEY RECOVERY SYSTEM

This is a regular US patent application which is derived from the copending provisional U.S. patent application Ser. No. 60/047,499, filed May 23, 1997, by Sekar Chanderseka-ran and Sarbari Gupta, entitled "FRAMEWORK-BASED CRYPTOGRAPHIC KEY RECOVERY SYSTEM", and assigned to the IBM Corporation.

BACKGROUND OF THE INVENTION

1. Field of the Invention

This invention relates to a cryptographic key recovery system and, more particularly, to a flexible key recovery system that is based on a framework.

2. Description of the Related Art

Copending US Patent Application of D. B. Johnson et al., Ser. No. 08/629,815, filed Apr. 10, 1996, entitled "Cryptographic Key Recovery System" ("Johnson et al. I"), assigned to the International Business Machines Corporation, is incorporated herein by reference. This cited patent application describes a key recovery system using multiple key recovery agents.

Copending application of D. B. Johnson et al., Ser. No. 08/681,679, filed Jul. 29, 1996, entitled "Interoperable Cryptographic Key Recovery System" ("Johnson et al. II"), assigned to the International Business Machines Corporation, is incorporated herein by reference. This cited patent application describes another key recovery system.

1. Background

In recent times, cryptography has come into widespread use in meeting multiple security needs, such as confidentiality, integrity, authentication and non-repudiation [SCHN, MENE]. The use of cryptographic products for confidentiality creates the need for supporting conflicting requirements between users and their respective governments or enterprises. While users have a legitimate need to establish and maintain confidentiality of their data and communications, governments and enterprises have, at times, a legitimate need to intercept and recover such confidential data and communications under proper legal conditions. This conflict becomes especially apparent when users' applications begin to use strong encryption techniques, which can either be too expensive or impossible to break within reasonable time.

Some governments such as the US, Canada, and France, impose controls on the export and foreign dissemination of cryptographic products on the premise that they are critical to national security and foreign policy interests. This is a major hindrance for manufacturers and vendors of cryptographic products since the market for their encryption products is severely restricted by such jurisdiction-based controls. To mitigate this, key recovery techniques have been proposed as a means to relax export controls on cryptographic products. Certain governments, such as the US, now have a stated policy that strong encryption based products can be licensed for general purpose export if they can be shown to incorporate an acceptable mechanism for key recovery. Adoption of such a policy enables cryptographic product vendors to develop a single international version of their product that contains strong encryption along with some technique for key recovery.

Key recovery mechanisms serve other useful purposes as well. They may be used by individuals to recover lost or corrupted keys; they may be used by enterprises to deter corporate insiders from using encryption to bypass the corporate security policy regarding the flow of proprietary information. Corporations may also use key recovery mechanisms to recover employee keys in certain situations, e.g. in the employees absence. Finally, the use of key recovery mechanisms in web based transactional scenarios can serve as an additional technique of non-repudiation and audit, that may be admissible in a court of law. Thus, there appear to be added incentives—beyond those of satisfying the governments needs—for the incorporation as well as adoption of key-recovery mechanisms in local and distributed encryption based systems.

Several vendors, such as Hewlett Packard, Trusted Information Systems and others have or are developing exportable cryptographic systems based on key recovery techniques. Most currently available or proposed architectures for key-recovery-enabled cryptographic systems are somewhat restrictive and inflexible. The design of some of these products is based on restrictive assumptions such as all users need to be certified under a common public key infrastructure (PK). Others products are very inflexible since they bundle a specific key recovery mechanism with a specific key transport mechanism or a specific cryptographic engine. Others support a single proprietary key recovery mechanism, which may not be acceptable for export to certain jurisdictions that choose not to adopt or legislatively support that key recovery mechanism. To avoid these and possibly other limitations, we propose an architecture for key-recovery-enabled cryptographic systems that has the potential to support a wide variety of key recovery mechanisms and cryptographic mechanisms under a common uniform framework. The additional benefits of such a framework-based solution, is that it is not tied to any particular communications protocol or key transport mechanism, and can be adapted to conform to any jurisdiction-based, key-recovery policy.

1.1. Key Recovery Nomenclature

Denning and Branstad [DENN], present a taxonomy of key escrow systems. In this document, a different scheme of nomenclature was adopted in order to exhibit some of the finer nuances of key recovery schemes. The term key recovery encompasses mechanisms that allow authorized parties to retrieve the cryptographic keys used for data confidentiality, with the ultimate goal of recovery of encrypted data. The remainder of this section will discuss the various types of key recovery mechanisms, the phases of key recovery, and the policies with respect to key recovery.

1.1.1. Key Recovery Types

There are two classes of key recovery mechanisms based on the way keys are held to enable key recovery: key escrow and key encapsulation. Key escrow techniques are based on the paradigm that the government or a trusted party called an escrow agent, holds the actual user keys or portions thereof Key encapsulation techniques, on the other hand, are based on the paradigm that a cryptographically encapsulated form of the key is made available to parties that require key recovery; the encapsulation technique ensures that only certain trusted third parties called recovery agents can perform the unwrap operation to retrieve the key material buried inside. There may also be hybrid schemes that use some escrow mechanisms in addition to encapsulation mechanisms.

An orthogonal way to classify key recovery mechanisms is based on the nature of the key that is either escrowed or encapsulated. Some schemes rely on the escrow or encapsulation of long-term keys, such as private keys, while other schemes are based on the escrow or encapsulation of ephemeral keys such as bulk encryption keys. Since escrow schemes involve the actual archival of keys, they typically deal with long-term keys, in order to avoid the proliferation problem that arises when trying to archive the nyriad ephemeral keys. Key encapsulation techniques, on the other hand, usually operate on the ephemeral keys.

For a large class of key recovery (escrow as well as encapsulation) schemes, there are a set of key recovery fields that accompany an enciphered message or file. These key recovery fields may be used by the appropriate authorized parties to recover the decryption key and or the plaintext. Typically, the key recovery fields comprise information regarding the key escrow or recovery agent(s) that can perform the recovery operation; they also contain other pieces of information to enable recovery.

In a key escrow scheme for long-term private keys, the "escrowed" keys are used to recover the ephemeral data confidentiality keys. In such a scheme, the key recovery fields may comprise the identity of the escrow agent(s), identifying information for the escrowed key, and the bulk encryption key wrapped in the recipients public key (which is part of an escrowed key pair); thus the key recovery fields include the key exchange block in this case. In a key escrow scheme where bulk encryption keys are archived, the key recovery fields may comprise information to identity the escrow agent(s), and the escrowed key for that enciphered message.

In a typical key encapsulation scheme for ephemeral bulk encryption keys, the key recovery fields are distinct from the key exchange block, (if any.) The key recovery fields identify the recovery agent(s), and contain the bulk encryption key encapsulated using the public keys of the recovery agent(s).

The key recovery fields are generated by the party performing the data encryption, and associated with the enciphered data. To ensure the integrity of the key recovery fields, and its association with the encrypted data, it may be required for processing by the party performing the data decryption. The processing mechanism ensures that successful data decryption cannot occur unless the integrity of the key recovery fields are maintained at the receiving end. In schemes where the key recovery fields contain the key exchange block, decryption cannot occur at the receiving end unless the key recovery fields are processed to obtain the decryption key; thus the integrity of the key recovery fields are automatically verified. In schemes where the key recovery fields are separate from the key exchange block, additional processing has to happen to ensure that decryption of the ciphertext occurs only after the integrity of the key recovery fields are verified.

With escrow schemes for long terms private keys, a major advantage is that the cryptographic communication protocol needs minimal adaptation (since the key recovery fields and the key exchange block are one and the same in most cases); however, the serious disadvantages are the lack of privacy for individuals (since their private keys are held by a separate entity), and the lack of granularity with respect to the recoverable keys. Additionally, there is the burden that every individual has to obtain and use public keys through an approved public key infrastructure in order for the key recovery scheme to work.

The major advantage to key encapsulation schemes based on ephemeral keys are that there is much greater privacy for the individuals; they can generate and keep their own private keys. Each ephemeral key can be recovered independently, so there is maximal granularity with respect to the recoverable keys. A disadvantage is that the communication protocol between sending and receiving parties needs more elaborate adaptation to allow the flow of the encapsulated key (which is separate from the key exchange block.) Another disadvantage is that there is some performance penalty in key encapsulation for each ephemeral key; however, this may be minimized by caching techniques.

SUMMARY OF THE INVENTION

The Secure Key Management Framework (SKMF) defines an infrastructure for a complete set of cryptographic services augmented with key recovery enablement. There are three major layers—the application layer invokes the SKMF layer, while the SKMF layer invokes the service provider (SP) layer. The application layer code invokes the cryptographic API and key-recovery API supported by the SKMF. Multiple key recovery mechanisms and cryptographic mechanisms can be implemented as service providers that plug-in underneath the framework using the well-defined service provider interfaces provided by the framework. The SKMF implements the supported API calls by making appropriate invocations of the service provider modules using the SPIS. The primary functionality of the SKMF layer is to maintain state regarding the connections between the application layer code and the service providers underneath. Additionally, the SKMF mediates all interactions between applications and CSPs, and implements and enforces the applicable key recovery policy. Finally, the SKMF allows the seamless integration of the key recovery functions and the cryptographic functions provided by independent service provider modules.

The design of the SKMF starts with an existing cryptographic framework that meets certain abstract properties such as extensibility and modularity. Next, the cryptographic framework is extended laterally to include a key recovery module manager that supports a set of key recovery APIs (KR-APIs) for use by application layer code and a set of key recovery SPIs (KR-SPIs) to support plug-in key recovery service provider modules. The KR-APIs are used to set state and attribute information for use by the key recovery service providers, and to generate and validate the key recovery blocks for confidentiality protected sessions. The KR module manager also contains the static key recovery enablement policy table and an enforcement module that ensures that all cryptographic associations abide by the key recovery enablement policy.

The base cryptographic module manager is modified to accommodate the key recovery module manager. While the base cryptographic API is kept intact (in order to perturb existing applications as little as possible), the cryptographic module manager is modified to invoke the key recovery policy enforcement module. If key recovery enablement if required for a certain cryptographic operation, the key recovery enablement operations need to be invoked appropriately before the invocation of the cryptograph operation. As a result, a dependency is created between the key recovery enablement operation and certain cryptographic operations. Since key recovery enablement typically required additional parameters such as public keys of key recovery agents, authorization information for user, etc., these additional parameters need to be provided to the SKMF through some mechanisms. The KR-APIs can be used by the application layer code to set up he necessary parameters for key recovery enablement. These parameters are held as state information within the KR management module.

The KRSPs perform two fundamental operations with respect to key recovery enablement: key recovery block generation, and key recovery block processing. On the sending side of a cryptographic association, key recovery enablement implies that a key recovery block be generated and sent out to the receiving side. On the receiving side, key recovery enablement requires that the key recover block be processed before decryption can occur; processing ensures that the key recovery block was transmitted intact from the sender to the receiver.

BRIEF DESCRIPTION OF THE DRAWINGS

FIG. 1.2 illustrates the three phases of key recovery.

FIG. 2.1 shows a simplified view of the layered architecture of a SKMF based system.

FIG. 3.1 shows three scenarios of inter-operability.

FIG. 4.1 shows the Common Data Security Architecture.

FIG. 4.2 shows the SecureWay Key Management Framework architecture.

FIG. 4.3 shows encrypted communications without key recovery.

FIG. 4.4 shows encrypted communications with recovery enablement.

FIG. 5.1 shows the self integrity check of the SKMF.

FIG. 5.2 shows Integrity verification of service providers by the SKMF.

FIG. 5.3 shows authentication of the SKMF by a dynamically-linked service provider.

FIG. 5.4 shows noncircumventability of the SKMF.

DESCRIPTION OF THE PREFERRED EMBODIMENTS

Figure 1:
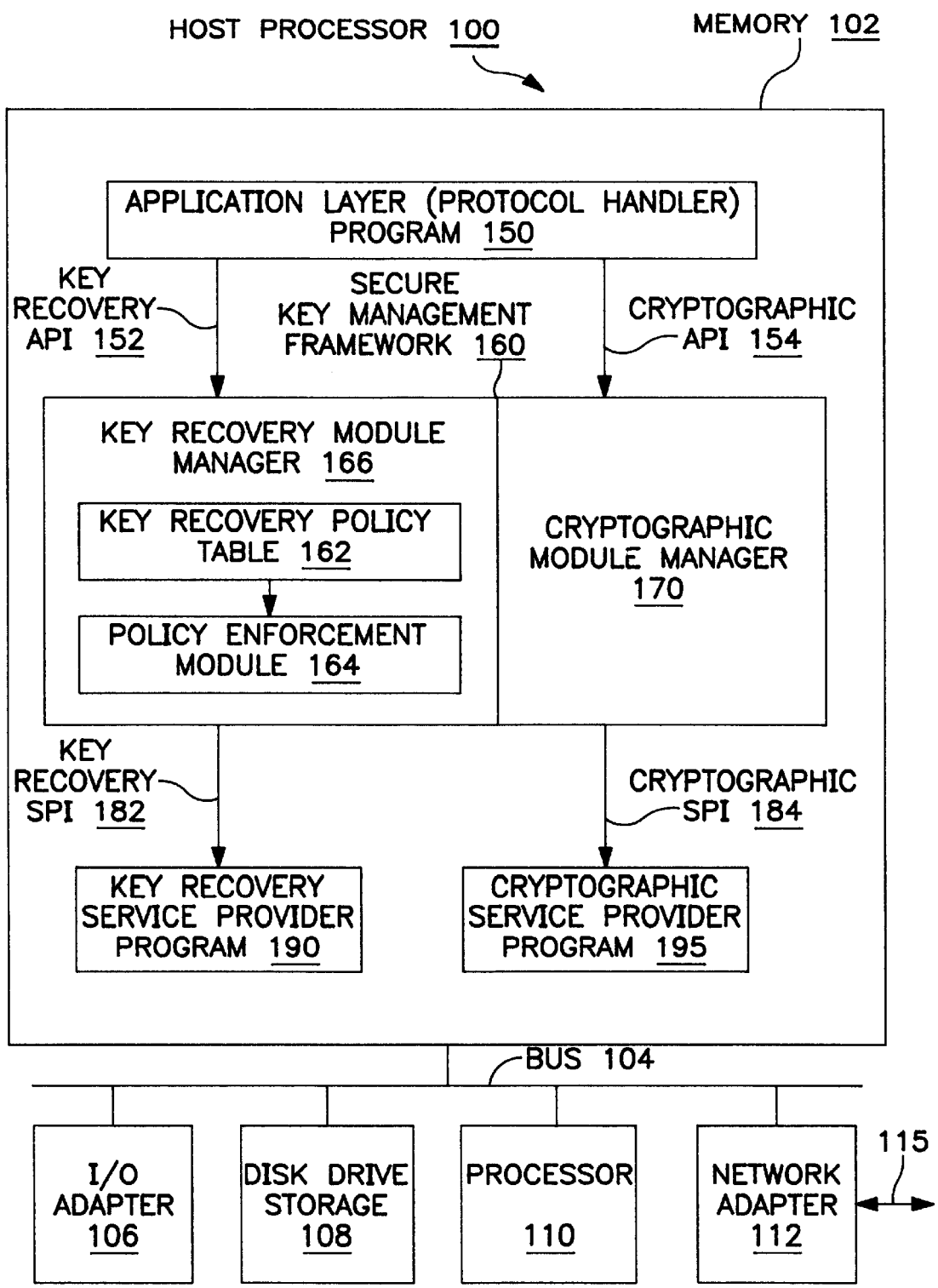
FIG. 1 shows a computer processor system connected to a communications network, in accordance with the invention.

FIG. 1 shows a computer processor system connected to a communications network, in accordance with the invention. The host processor 100 includes the memory 102, the system bus 104 that connects the memory 102 to the processor 110. Bus 104 also connects to the I/O adapter 106, the disk drive storage 108, and the network adapter 112. The network adapter 112 connects the host processor to the communications network 115.

The memory 102 stores programs and data, as shown. The application layer (protocol handler) program 150 is stored in memory 102. The secure key management framework 160 is stored in memory 102. The secure key management framework (SKMF) 160 includes the key recovery module manager 166 and the cryptographic module manager 170. The application layer (protocol handler) program 150 interfaces with the key recovery module manager 166 by means of the key recovery application program interface (API) 152. The application layer (protocol handler) program 150 interfaces with the cryptographic module manager 170 by means of the cryptographic API 154. The key recovery module manager 166 includes the key recovery policy table 162 which flows to the policy enforcement module 164. The key recovery policy table 162 can alternately be loaded as a separate file and stored in the memory external to the secure key management framework 160. + The key recovery service provider program 190 is stored in memory 102. The cryptographic service provider program 195 is stored in memory 102. The key recovery module manager 166 interfaces with the key recovery service provider program 190 by means of the key recovery service provider interface 182 is stored in memory 102. The cryptographic service provider program 195 is stored in memory 102. The key recovery module manager 166 interfaces with the key recovery service provider program 190 by means of the key recovery service provider interface (SPI) 182. The cryptographic module manager 170 interfaces with the cryptographic service provider program 195 by means of the cryptographic SPI 184.

The Secure Key Management Framework (SKMF) defines an infrastructure for a complete set of cryptographic services augmented with key recovery enablement. The layered architecture of a SKMF based system is depicted in FIG. 1. There are essentially three major layers—the application layer invokes the SKMF layer, while the SKMF layer invokes the service provider (SP) layer. The application layer code invokes the cryptographic API and key-recovery API supported by the SKMF. Multiple key recovery mechanisms and cryptographic mechanisms can be implemented as service providers that lug-in underneath the framework using the well-defined service provider interfaces provided by the framework. The SKMF implements the supported ATP calls by making appropriate invocations of the service provider modules using the SPIs. The primary functionality of the SKMF layer is to maintain state regarding the connections between the application layer code and the service providers underneath. Additionally, the SKMF mediates all interactions between applications and CDPs, and implements and enforces the applicable key recovery policy. Finally, the SKMF allows the seamless integration of the key recovery functions and the cryptographic functions provided by independent service provider modules.

The design of the SKMF starts with an existing cryptographic framework that meets certain abstract properties such as extensibility and modularity. Next, the cryptographic framework is extended laterally to include a key recovery module manager that supports a set of key recovery APIs (KR-APIs) for use by application layer code and a set of key recovery SPIs (KR-SPIs) to support plug-in key recovery service provider modules. The KR-APIs are used to set state and attribute information for use by the key recovery service providers, and to generate and validate the key recovery blocks for confidentiality protected sessions. The KR module manager also contains the static key recovery enablement policy table and an enforcement module that ensures that all cryptographic associations abide by the key recovery enablement policy.

The base cryptographic module manager is modified to accommodate the key recovery module manager. While the base cryptographic API is kept intact (in order to perturb existing applications as little as possible), the cryptographic module manager is modified to invoke the key recovery policy enforcement module. If key recovery enablement if required for a certain cryptographic operation, the key recovery enablement operations need to be invoked appropriately before the invocation of the cryptograph operation. As a result, a dependency is created between the key recovery enablement operation and certain cryptographic operations. Since key recovery enablement typically required additional parameters such as public keys of key recovery agents, authorization information for user, etc., these additional parameters need to be provided to the SKMF through some mechanisms. The KR-APIs can be used by the application layer code to set up he necessary parameters for key recovery enablement. These parameters are held as state information within the KR management module.

The KRSPs perform two fundamental operations with respect to key recovery enablement: key recovery block generation, and key recovery block processing. On the sending side of a cryptographic association, key recovery enablement implies that a key recovery block be generated and sent out to the receiving side. On the receiving side, key recovery enablement requires that the key recover block be processed before decryption can occur; processing ensures that the key recovery block was transmitted intact from the sender to the receiver.

DETAILED DESCRIPTION OF THE INVENTION 1.1.2. Key Recovery Phases

The process of cryptographic key recovery involves three major phases. First, there is an optional key recovery registration phase where the parties that desire key recovery perform some initialization operations with the escrow or recovery agents; these operations include obtaining a user public key certificate (for an escrowed key pair) from an escrow agent, or obtaining a public key certificate from a recovery agent. Next, parties that are involved in cryptographic associations have to perform operations to enable key recovery (such as the generation of key recovery fields, etc.)—this is typically called the key recovery enablement phase. Finally, authorized parties that desire to recover the data keys, do so with the help of a recovery server and one or more escrow agents or recovery agents—this is the key recovery request phase.

FIG. 2.1 illustrates the three phases of key recovery. In FIG. 2.1, a key recovery client registers with a recovery agent prior to engaging in cryptographic communication. In FIG. 2.1, two key-recovery-enabled cryptographic applications are communicating using a key encapsulation mechanism; the key recovery fields are passed along with the ciphertext and key exchange block, to enable subsequent key recovery. The key recovery request phase is illustrated in FIG. 2.1, where the key recovery fields are provided as input to the key recovery server along with the authorization credentials of the client requesting service. The key recovery server interacts with one or more local or remote key recovery agents to reconstruct the secret key that can be used to decrypt the ciphertext.

It is envisioned that governments or organizations will operate their own recovery server hosts independently, and that key recovery servers may support a single or multiple key recovery mechanisms. There are a number of important issues specific to the implementation and operation of the key recovery servers, such as vulnerability and liability. The focus of this document is a framework based approach to implementing the key recovery operations pertinent to end parties that use encryption for data confidentiality. The issues with respect to the key recovery server and agents will not be discussed further here.

1.1.3. Lifetime of Key Recovery Fields

Cryptographic products fall into one of two fundamental classes: archived-ciphertext products, and transient-ciphertext products. When the product allows either the generator or the receiver of ciphertext to archive the ciphertext, the product is classified as an archived-ciphertext product. On the other hand, when the product does not allow the generator or receiver of ciphertext to archive the ciphertext, it is classified as a transient-ciphertext product.

It is important to note that the lifetime of key recovery fields should never be greater than the lifetime of the associated ciphertext. This is somewhat obvious, since recovery of the key is only meaningful if the key can be used to recover the plaintext from the ciphertext. Hence, when archived-ciphertext products are key recovery enabled, the key recovery fields are typically archived as long as the ciphertext. Similarly, when transient-ciphertext products are key recovery enabled, the key recovery fields are associated with the ciphertext for the duration of its lifetime. It is not meaningful to archive key recovery fields without archiving the associated ciphertext.

1.1.4. Key Recovery Policy

Key recovery policies are mandatory policies that are typically derived from jurisdiction-based regulations on the use of cryptographic products for data confidentiality. Often, the jurisdictions for key recovery policies coincide with the political boundaries of countries, in order to serve the law enforcement and intelligence needs of these political jurisdictions. Political jurisdictions may choose to define key recovery policies for cryptographic products based on export, import, or use controls. Enterprises may define internal and external jurisdictions, and may mandate key recovery policies on the cryptographic products within their own jurisdictions.

Key recovery policies come in two flavors: key recovery enablement policies and key recovery inter-operability policies. Key recovery enablement policies specify the exact cryptographic protocol suites (algorithms, modes, key lengths etc.) and perhaps usage scenarios, where key recovery enablement is mandated. Furthermore, these policies may also define the number of bits of the cryptographic key that may be left out of the key recovery enablement operation; this is typically referred to as the workfactor. Key recovery inter-operability policies specie to what degree a key-recovery-enabled cryptographic product is allowed to inter-operate with other cryptographic products.

1.1.5. Operational Scenarios for Key Recovery

There are three basic operational scenarios for key recovery, namely, law enforcement key recovery enterprise key recovery individual key recovery In the law enforcement scenario, key recovery is mandated by the jurisdictional law enforcement authorities in the interest of national security and law enforcement. For a specific cryptographic product, the key recovery policies for multiple jurisdictions may apply simultaneously. The policies (if any) of the jurisdiction(s) of manufacture of the product, as well as the jurisdiction of installation and use, need to be applied to the product such that the most restrictive combination of the multiple policies is used. Thus, law enforcement key recovery is based on mandatory key recovery policies; these policies are logically bound to the cryptographic product at the time the product is shipped. There may be some mechanism for vendor-controlled updates of such law enforcement key recovery policies in existing products; however, organizations and end users of the product are not able to modify this policy at their discretion. The escrow or recovery agents used for this scenario of key recovery need to be strictly controlled in most cases, to ensure that these agents meet the eligibility criteria for the relevant political jurisdiction where the product is being used.

Enterprise key recovery allows enterprises to enforce stricter monitoring of the use of cryptography, and the recovery of enciphered data when the need arises. Enterprise key recovery is also based on a mandatory key recovery policy; however, this policy is set (perhaps, through administrative means) by the organization or enterprise at the time of installation of a recovery enabled cryptographic product. The enterprise key recovery policy should not be modifiable or by-passable by the individual using the cryptographic product. Enterprise key recovery mechanisms may use special, enterprise authorized escrow or recovery agents.

Individual key recovery is user-discretionary in nature, and is performed for the purpose of recovery of enciphered data by the owner of the data, if the cryptographic keys are lost or corrupted. Since this is a non-mandatory key recovery scenario, it is not based on any policy that is enforced by the cryptographic product; rather, the product may allow the user to specify when individual key recovery enablement is to be performed. There are few restrictions on the use of specific escrow or recovery agents.

In each of these scenarios, key recovery may be desired. However, the detailed aspects or characteristics of these three scenarios are somewhat varied. FIG. 1.2 summarizes the specific characteristics of the different operational scenarios.

Key recovery enabled cryptographic products must be designed so that the key recovery enablement operation is mandatory and noncircumventable in the law enforcement and enterprise scenarios, and discretionary for the individual scenario. The escrow and recovery agent(s) that are used for law enforcement and enterprise scenarios must be tightly controlled so that the agents are validated to belong to a set of authorized or approved agents. In the law enforcement and enterprise scenarios, the key recovery process typically needs to be performed without the knowledge and cooperation of the parties involved in the cryptographic association.

The components of the key recovery fields also varies somewhat between the three scenarios. In the law enforcement scenario, the key recovery fields must contain identification information for the escrow or recovery agent(s); whereas for the enterprise and individual scenarios, the agent identification information is not so critical, since this information may be available from the context of the recovery enablement operation. For the individual scenario, there needs to be a strong user authentication component in the key recovery fields, to allow the owner of the key recovery fields to authenticate themselves to the agents; however, for the enterprise and law enforcement scenarios, the authorization credentials checked by the agents may be in the form of legal documents, or enterprise-authorization documents for key recovery, that may not be tied to any authentication component in the key recovery fields. For the law enforcement and enterprise scenarios, the key recovery fields may contain recovery information for both the generator and receiver of the enciphered data; in the individual scenario, only the information of the generator of the enciphered data is typically included (at the discretion of the generating party.)

1.2. Motivation for Framework Approach

In the context of this document, a framework is a layer of abstraction that isolates application code (that requires a set of services) from the modules that actually implement the services; the application deals with an abstract application programming interface (API), while the service providers conform to abstract service provider interfaces (SPIs). There are several well-established advantages of a framework-based system. By providing clean, standardized interfaces for various parts of the system, a framework promotes layering, a high degree of modularity, decoupling of components, ease of module-based conformance testing, and the ability to mix and match modules that are produced by independent vendors that conform to standardized interfaces.

We have already established that there are several strong incentives for developing key-recovery-enabled cryptographic systems, and that existing implementations are seriously lacking in terms of flexibility and extensibility. Therefore, the primary motivation for a framework-based solution to key recovery, is to develop a very general purpose and open architecture that will allow the support of varied key recovery and cryptographic mechanisms. Moreover, such a framework based approach offers added benefits in terms of the communications protocols supported and the flexibility to use multiple PKIs.

There are multiple vendors that have or are in the process of developing cryptographic service provider modules, that are based on hardware or software cryptographic engines. These vendors would like to internationalize their products. Since, different countries around the world support different key recovery systems, embedding a single key recovery mechanism into the cryptographic engine is counterproductive, since the composite product may not be suitable for use in certain jurisdictions. Additionally, there is a burden on the vendors of cryptographic service providers (CSPs) to incorporate key recovery mechanisms that are, by and large, unrelated to the central purpose of the product. Thus, it is highly desirable to decouple the key recovery enablement service from the underlying cryptographic service.

The concept of a cryptographic framework (such as Microsofts Cryptographic API [CAPI], or Intels Common Data Security Architecture [CDSAI]) grew out of the need to provide an abstract set of cryptographic services to application level code; the cryptographic framework isolates the applications from the idiosyncrasies of specific cryptographic service providers. Similarly, the concept of a framework-based key recovery solution grew out of the need to provide an abstract set of key-recovery-enabled cryptographic services to application level code. While the application uses a uniform set of APIs, the framework may allow the plug-in of multiple and varied cryptographic service provider modules and key recovery service provider modules. The integration of the cryptographic service provider and key recovery service provider modules may be performed completely by the framework, by a method of strict sequencing of key recovery enablement operations and cryptographic operations; this kind of a framework architecture decouples the cryptographic mechanisms from the key recovery mechanisms, while allowing the seamless integration of independent CSPs and key recovery service providers (KRSPs) to provide a uniform set of services to application level code. This is a very important point since it allows the CSPs to remain unchanged and oblivious of key recovery mechanisms. The abstraction provided by a framework-based architecture allows the APIs to be useful in a broad range of communication protocol and encryption environments 1.3. SecureWay(TM) Key Management Framework The SecureWay(TM) Key Management Framework (SKMF) defines an infrastructure for a complete set of cryptographic services augmented for key recovery operations. The simplified view of the layered architecture of a SKMF based system is depicted in FIG. 2.1. There are essentially three major layers—the application layer invokes the SKMF layer, while the SKMF layer invokes the service provider (SP) layer. The application layer code invokes the cryptographic API and key-recovery API supported by the SKMF. Multiple key recovery mechanisms and cryptographic mechanisms can be implemented as service providers that plug-in underneath the framework using the well-defined service provider interfaces provided by the framework. The SKMF makes appropriate invocations of the service provider modules using the SPIs. The primary functionality of the SKMF layer is to maintain state regarding the connections between the application layer code and the service providers underneath. Additionally, the SKMF mediates all interactions between applications and CSPs, and implements and enforces the applicable key recovery export policy. Finally, the SKMF allows the seamless integration of the key recovery functions and the cryptographic functions provided by independent service provider modules.

The design of the SKMF starts with an existing security services framework that meets certain abstract properties, such as extensibility and modularity. Next, the security services framework is extended laterally to include a key recovery module manager that supports a set of key recovery APIs (KR-APIs) for use by application layer code, and a set of key recovery SPIs (KR-SPIs) to support plug-in key recovery service provider modules. The KR-API functions are used to set state and attribute information for use by the key recovery service providers; they are also used to perform key recovery operations. The KR module manager links in one or more key recovery enablement policies; these policies may be law enforcement policies or enterprise policies. The key recovery policies are logically part of the KRMM and is consulted by the latter to ensure that all cryptographic associations abide by the key recovery enablement policies.

The base cryptographic module manager is modified to accommodate the key recovery module manager. While the base cryptographic API is kept intact (in order to perturb existing applications as little as possible), the cryptographic module manager is modified to invoke the key recovery policy enforcement module. Certain cryptographic operations are disallowed until the appropriate key recovery operations are invoked. This scheme imposes a strict sequencing between the key recovery enablement operations, and the cryptographic operations. The additional parameters required for key recovery enablement (such as public keys of key recovery agents, authentication information for users, etc.,) may be provided through the KR-APIs. These parameters are held as state information within the KR management module. When key recovery operations are requested by the application, the KR module manager invokes the key recovery service provider module, and passes to the latter the key recovery state information.

The KRSPs perform two fundamental operations with respect to key recovery enablement: key recovery fields generation, and key recovery fields processing. On the sending side of a cryptographic association, key recovery enablement implies that a key recovery fields be generated and sent out to the receiving side. On the receiving side, key recovery enablement requires that the key recovery fields be processed before decryption can occur; processing ensures that the key recovery fields was transmitted intact from the sender to the receiver. For archival applications that are key recovery enabled, the sender and receiver (as discussed above) are one and the same. In such applications, key recovery enablement implies that the key recovery fields are generated and archived along with the ciphertext, and that the key recovery fields are processed before decryption of the archived ciphertext can occur.

The KRSPs also perform key recovery registration and request operations. The key recovery registration operation allows the establishment of a user key recovery profile for a given key recovery service provider. The key recovery request operations support the recovery of confidentiality keys.

The general model of key recovery presented earlier in this section, allows the unification of key escrow and key encapsulation schemes into a single abstraction. The SKMF is based on this abstract model of key recovery that encompasses key escrow as well as key encapsulation techniques. This allows the SKF to support plug-in key recovery service providers that implement a large class of key escrow as well as key encapsulation schemes.

The SKMF is architected to support all three scenarios of key recovery enablement. The details of how this is performed are covered in a subsequent chapter in this document.

1.4. Document Outline

The rest of this document is organized as follows. Chapter 2 describes some of the abstract properties of the SKMF. Chapter 3 presents the inter-operability issues with respect to key recovery enabled products. Chapter 4 delves into the design of the SKMF architecture and describes its components. Chapter 5 discusses the exportability issues relevant to the SKMF architecture. Chapters 6 and 7 describe the Key Recovery Application Programming Interface and the Key Recovery Service Provider Interface, respectively, with syntactic details of the exact functions and their parameters. Chapter 8 lists some relevant references.

2. SKMF Properties

The SKMF layer possesses several abstract properties that allow it to provide key recovery enablement to a set of cryptographic services. These properties are:

2.1. Replacement Independence and Modularity of KR Services

This property ensures that the KR Service Providers (KRSPs) supported underneath the SKMF can be seamlessly replaced without affecting the operation of the application running on top of the framework. This property relies on the desirable goal of making the KR-APIs independent of the underlying KR mechanisms. However, replacement independence of the KR services requires that framework be sufficiently generic and abstract such that KRSPs can be plugged/unplugged in/from the framework code without changing the KR-APIs or the applications invoking them. Either component can be replaced in a modular fashion without affecting the operation of the other.

2.2. Separation of Policy from Mechanism

The SKMF layer is responsible for enforcing the key recovery policy. The actual mechanism for key recovery enablement is embedded in the KRSP that is used and is clearly separated from the SKMF.

2.3 Noncircumventability

Noncircumventability implies that the application layer code using the SKMF to obtain cryptographic services cannot bypass the framework to directly access the service providers underneath. Available operating system protection mechanisms are to be utilized to the fullest extent to ensure that the framework is not by-passable. A further aspect of the noncircumventability property dictates that there must exist an invocation dependency between the cryptographic operations and the key recovery enablement operations, such that the appropriate key recovery operations are always invoked before the application can obtain cryptographic services from the framework.

2.4 Isolation

The SKMF needs to be isolated from the application layer code in order to ensure that the key recovery policy enforcement module cannot be tampered with. To achieve isolation and tamperproofniess, the SKMF must ensure that (1) the parameters passed in through the APIs are verified at each invocation, (2) there are controlled entry points through which the APIs may be invoked, and (3) the address spaces of the KR mechanisms and policies are separated (to the extent possible within the application domain) from those of the application layer code invoking the APIs.

To ensure the isolation of KR services and mechanisms, the framework must ensure that (1) the APIs verify the parameters passed at each invocation, (2) the APIs are invoked through, and return to, proper entry points, and (3) address spaces of the KR mechanisms and policies are separated (to the extent possible within the application domain) from those of the user applications invoking the KR APIs. Other penetration-resistance properties that apply to the SKMF as well as to other trusted software are presented elsewhere.

2.5. Manifest Recovery/Intercept Points

The separation of the key recovery server and key recovery agents from the framework APIs and management functions implies that the KR fields must uniquely identify the key recovery mechanism being used and the key recovery server that can be used to retrieve the keys. Note that this property must be guaranteed by the framework itself, since individual recovery mechanisms may be unconcerned with the presence of other recovery mechanisms and services in a system.

3. Inter-operability Scenarios for Key-recovery enabled Products

In the world of the Internet, inter-operability of key recovery enabled cryptographic products with other products is an absolute necessity. The key recovery inter-operability policy specifies how a key recovery product can inter-operate with other products. According to the US export policy, key recovery products are allowed to inter-operate with other key recovery products using strong encryption as long as the key recovery fields are made available to law enforcement.

For products using key recovery (escrow or encapsulation) techniques, the key recovery policy stipulates that when using strong encryption, the sending side cannot perform data encryption without producing the necessary key recovery fields, and that the receiving side cannot perform data decryption without processing the relevant key recovery fields. The key recovery fields have to be transmitted from the sender to the receiver—implying that the communication protocol between the sender and the receiver has to be augmented to allow the passage of the additional fields. Fundamentally there are three scenarios of inter-operability as shown in FIG. 3.1.

Let us examine each of the three scenarios of inter-operability with respect to a SKMF based system where the SKMF and its plug-in service providers are high assurance modules, while the application layer code is low assurance. In other words, we have trust in the SKMF and SP components, while we do not have trust in the application layer code. There is a good reason for assuming that the SKMF and SPs are trusted, since these components undergo strict screening for export controls while the application code undergoes little or no screening for exportability. Since the SKMF can at best generate and process the key recovery fields, it is the application layer code that actually has the burden of sending and receiving it. Let us define the application layer code as being "well-behaved" if it sends out the key recovery fields (generated by the SKMF) along with the session data and receives the key recovery fields from the session data and passes it down to the SKMF for processing.

In scenario (a), the sender generates the key recovery fields and sends them over to the receiver, and the receiver verifies them before allowing data decryption. This inter-operability scenario is easy to implement, since both the sender and receiver are aware of the additional key recovery fields and knows how to handle them. As long as the application layer code on at least one side is well-behaved, the key recovery enablement operation remains intact, since the key recovery fields need to flow along with the session data in order for a successful cryptographic association to occur. However, if the application layer code on both the sending and receiving sides are ill-behaved and are acting in collusion, then there are various cut-and-paste attacks that c an be mounted such that the key recovery fields either do not flow between sender and receiver, or flow out-of-band with the session; thus the key recovery enablement operation is inhibited.

In scenario (b), the sender is a KR system and the receiver is not. Full inter-operability in this scenario is a little more tricky since the sending side sends over the key recovery fields along with the session data, but the receiving side has to be able to ignore the additional fields and proceed with the decryption step. If the application layer code on the sending side is well-behaved, the key recovery operation is successful; however, if the application code on the sending side is ill-behaved, and does not send the key recovery fields as part of the session, the key recovery enablement operation is inhibited.

In scenario (c), the receiver is a key-recovery-enabled system while the sender is not. The receiving system should not be able to decrypt data until the key recovery fields is received from the sender. Since the sender has no notion of a key recovery fields, inter-operability in this case is nebulous at best. In key encapsulation schemes, a pure sender receiver association where only the receiver is key-recovery-enabled may not be feasible.

In discussing the above schemes, it becomes apparent that the set of requirements for a key-recovery-enabled system are somewhat in opposition to the inter-operability requirements for such systems. As pointed out before, the actual communication protocol between the sender and receiver has to be modified somewhat to allow the key recovery fields to flow. To allow inter-operability with systems that are not key-recovery-enabled, the key recovery fields is typically sent in a way that does not disturb the basic key transport mechanism or the ciphertext for the session. In this case, it may not be feasible to ensure the flow of the key recovery fields within the session from the sender to the receiver since the key recovery fields is not really needed for data decryption. Consider a variation of the SKMF scheme, where the key recovery fields is an integral part of the key transport mechanism, such that the actual key used to decrypt the data is a function of the key recovery fields. In this case, there is a very tight binding between the key recovery fields and the session data, but the inter-operability scenarios (b) and (c) become difficult, since the non-key recovery systems will not know how to reconstruct the decryption key using the key recovery fields.

4. SKMF Design 4.1. SKMF and CSSM

The Common Data Security Architecture (CDSA) defines the infrastructure for a complete set of security services based on cryptography. CDSA is an extensible architecture, that supports heterogeneous platform environments. It provides the ability to dynamically manage security modules in the form of service providers. The architecture comprises three major layers as shown in FIG. 4.1 below. The central component of the CDSA is the Common Security Services Manager (CSSM) which is a framework that provides a security services API to application code on top, and a set of service provider interfaces below for plug-in support of service providers. The CSSM comprises four sub-frameworks or module managers. Each module manager supports a service provider interface for a specific class of service providers. The CDSA supports four classes of service providers, namely:

cryptographic service providers
trust policy service providers
certificate library service providers
data library service providers These add-in service providers may be provided by independent vendors; application code can direct their requests to specific service provider modules as they see fit.

The SecureWay Key Management Framework architecture is based on the Intel CDSA. As shown if FIG. 4.2, the SKMF is defined as an extended CSSM that provides additional key management services such as key recovery operations. Essentially, the CSSM has been extended to include a Key Recovery Module Manager (KRMM), with a key recovery API (KR-API) on top and a key recovery SPI (KR-SPI) below. One or more Key Recovery Service Providers may be plugged-in under the KRMM. It may be noted that the SKMF API is a superset of the CSSM API. The Security Services Layer of the CDSA has been renamed to be the Framework Enabled Protocol Handler layer that implements cryptographic protocol handlers for storage and communications; the protocol handler determines how the ciphertext is stored or transmitted, and how the key recovery fields are associated with the ciphertext; Above this layer is the Application Domain layer that implements the end-user applications.

The CDSA is based on the usage of Globally Unique Identifiers (GUIDs) for all service providers that are used as plug-in modules. The KR-API is based on the same paradigm and uses GUIDs to identify KRSPs in a unique way. The KRSPs implement the key recovery service provider interface (KR-SPI) and can be plugged-in underneath the framework. The KR-API was designed to support a two party cryptographic exchange. It does not support the multicast scenario at this time. The KR-API provides some query service functions to determine what KRSPs are installed on the local system; protocol handler layer code can use this information to determine which KRSP to use within a session.

Further details on the design rationale and specifics of the CDSA and CSSM may be obtained from [CDSA1], the CSSM application programming interface function details may be obtained from [CDSA2], and the CDSA cryptographic service provider interface functions may be found in [CDSA3]. This document will only describe the design of the key recovery extensions to the CSSM and the issues related to the extension.

4.2. Functionality Definition

The SKMF architecture is based on a number of assumptions regarding the functions performed by the various layers. The protocol handler layer code is assumed to perform the following functions with respect to key recovery:

determination of key recovery mechanism (perhaps through negotiation with peer) and selection of an appropriate key recovery service provider
identification of the peers in the cryptographic association
set up and update of key recovery parameters for the peers in the cryptographic association
invocation of the key recovery field generation function and associating the generated fields with the ciphertext
retrieval of the key recovery fields from the protocol message or file and invocation of the key recovery field processing function
understanding the semantics of the opaque input parameters for the key recovery registration and recovery request operations
providing callbacks to allow the KRSP to to dynamically obtain additional input from the application layer code, and interact with the human interface, if necessary.
providing valid profile information to the SKMF for both local and remote entities.

The SKMF layer code is assumed to perform the following functions with respect to key recovery:

maintaining key recovery context or state information
determination of when key recovery fields need to be generated or processed
invocation of the KR-SPI with appropriate parameters when key recovery operations are invoked The Key Recovery Service Provider is assumed to perform the following functions with respect to key recovery:

validation of any and all recovery agent certificates by selection of appropriate certificate library and trust policy service providers
choosing an appropriate CSP to use as a cryptographic engine for key recovery field generation
generation of the key recovery fields
processing of the key recovery fields
exchanging messages with a possibly remote key recovery agent/server for recovery registration and request operations
invocation of supplied callbacks to obtain additional input information, as necessary
maintaining state about asynchronous recovery registration and request operations to allow the application layer code to check (by polling) if the results of a registration or request operation are available.
maintaining a default set of KRA certificates to use for the LE and ENT key recovery scenarios.

4.3. Modification of the Cryptographic Module Manager

The Cryptographic Module Manager of the CSSAM is responsible for handling the cryptographic functions of the SKMF. In order to introduce the necessary dependencies between the cryptographic operations and the key recovery enablement operations, the cryptographic module manager of the SKMF is a modified version of the CSSM cryptographic module manager.

The cryptographic context data structure of the CSSM has been augmented to include the following key recovery extension fields:

a usability field for key recovery
a workfactor field for law enforcement key recovery The usability field denotes whether a cryptographic context needs to have key recovery enablement operations (either for law enforcement or enterprise needs,) performed before it can be used for cryptographic operations such as encrypt or decrypt. The workfactor field holds the allowable workfactor value for law enforcement key recovery. These two additional fields of the cryptographic context are not available to the API for modification. They are set by the KRMM when the latter makes the key recovery policy enforcement decision for law enforcement and enterprise policies.

Although the CSSM API has been left intact in the SKMF, the behavior of some of the cryptographic functions has been modified somewhat to accommodate the above-mentioned extensions to the cryptographic context. The basic changes are as follows:

invoke key recovery policy enforcement functions for cryptographic context creation and update operations
set the usability field in the cryptographic context to render the context unusable if key recovery enablement operations are mandated
check the cryptographic context usability field before allowing encrypt/decrypt operations to occur Whenever a cryptographic context is created or updated using the SKMF API functions, the cryptographic module manager invokes a KRMM policy enforcement function module; the latter checks the law enforcement and enterprise policies to determine whether the cryptographic context defines an operation where key recovery is mandated, If so, the usability field value is set in the cryptographic context data structure to signify that the context is unusable until key recovery enablement operations are performed on this context. The usability field is essentially a bitmap that signifies whether key recovery is required by the law enforcement or enterprise key recovery policies. When the appropriate key recovery enablement operations are performed on this context, th e bits in the usability field is appropriately toggled so that the cryptographic context becomes usable for the intended operations.

When the encryption/decryption operations of the SKMF are invoked, the cryptographic module manager checks the key recovery usability field in the cryptographic context to determine whether the context is usable for encryption/decryption operations. If the context is flagged as unusable, the encryption/decryption API function returns an error. When the appropriate key recovery enablement operations are performed on that context, the flag values are reset so that the context may then be usable for encryption/decryption.

4.4. Key Recovery Module Manager

The Key Recovery Module Manager is responsible for handling the KR-API functions and invocation of the appropriate KR-SPI functions. The KRMM enforces the key recovery policy on all cryptographic operations that are obtained through the SKMF. It maintains key recovery state in the form of key recovery contexts. It also maintains a persistent repository for key recovery parameters for each user and for each KRSP; these are called key recovery profiles.

4.3.1. Operational Scenarios

The SKMF architecture supports three distinct operational scenarios for key recovery, namely, key recovery for law enforcement purposes, enterprise purposes, and individual purposes. The law enforcement and enterprise scenarios for key recovery are mandatory in nature, thus the SKMF layer code enforces the key recovery policy with respect to these scenarios through the appropriate sequencing of KR-API and cryptographic API calls. On the other hand, the individual scenario for key recovery is completely discretionary and is not enforced by the SKMF layer code. The application/user requests key recovery operations using the KR-APIs at their discretion.

The three operational scenarios for key recovery enablement drive certain design decisions with respect to the SKMF. The details of the specific features of the operational scenarios are described in the following subsections.

4.3.2. Key Recovery Profiles

The KRSPs require certain pieces of information related to the parties involved in a cryptographic association in order to generate and process key recovery fields. These pieces of information (such as the public key certificates of the key recovery agents) are contained in key recovery profiles. The profiles contain all of the parameters for key recovery field generation and processing for that KRSP. The KRSP GUID specifies the KRSP for which a given key recovery profile record is relevant.

The information contained in the profile comprises the following:

a set of Key Recovery Agent (KRA) certificate chains for law enforcement key recovery a set of Key Recovery Agent (KRA) certificate chains for enterprise key recovery a set of Key Recovery Agent (KRA) certificate chains for individual key recovery authentication information for individual key recovery a set of key recovery flags that fine tune the behavior of a KRSP a public key certificate chain for the user an extension field The key recovery profiles support a list of KRA certificate chains for each of the law enforcement, enterprise, and individual key recovery scenarios, respectively. While the profile allows fill certificate chains to be specified for the KRAs, it also supports the specification of leaf certificates; in such instances, the KRSP and the appropriate TP modules are expected to dynamically discover the intermediate certificate authority certificates up to the root certificate of trust. One or more of these certificate chains may be set to NULL, if they are not needed or supported by the KRSP involved.

The user public key certificate chain is also part of a profile. This is a necessary parameter for certain key escrow and encapsulation schemes. Certain schemes support the notion of a user authentication field for individual key recovery. This field is used by the key recovery server and/or agent(s) to verify that the individual requesting key recovery is the owner of the key recovery fields, and can authenticate themselves based on the authentication information contained in the key recovery fields. One or both of these authentication information fields may be set to NULL, if their use is not required or supported by the KRSP involved.

The key recovery flags are defined values that are pertinent for a large class of escrow and recovery schemes. The extension field is for use by the KRSPs to define additional semantics for the key recovery profile. These extensions may be flag parameters or value parameters. The semantics of these extensions are defined by a KRSP; the application that uses profile extensions has to be cognizant of the specific extensions for a particular KRSP. However, it is envisioned that these extensions will be for optional use only. KRSPs are expected to have reasonable defaults for all such extensions; this is to ensure that applications do not need to be aware of specific KRSP profile extensions in order to get basic key recovery enablement services from a KRSP. Whenever the extensions field is set to NULL, the defaults should be used by a KRSP. Chapter 6 specifies the data structure for the profile.

The profiles for the local and remote parties involved in a cryptographic association are input parameters to several of the KR-API functions. Thus, application layer code is allowed to specify the profiles for all KR-API functions where profiles are relevant. These profiles are used by the KRSP to perform its operations. The KRSP maintains a default for the local as well as the remote profiles that it uses whenever the profiles received through the KR-API functions are set to NULL or when the profiles contains NULL values for relevant fields. For example, if the local profile passed through the KR-API has NULL for the LE KRA list entry, the corresponding values from the KRSP default local profile are used by the KRSP when generating the LE KRFs. These default profiles are read by the KRSP (at the time it is initialized) from a KRSP Configuration File.

4.3.3. Key Recovery Context

All operations performed by the KRSPs are performed within a key recovery context. A key recovery context is programmatically equivalent to a cryptographic context; however the attributes of a key recovery context are different from those of other cryptographic contexts. There are three kinds of key recovery contexts—registration contexts, enablement contexts and recovery request contexts. A key recovery context contains state information that is necessary to perform key recovery operations. When the KR-API functions are invoked by application layer code, the KRMM passes the appropriate key recovery context to the KRSP using the KR-SPI unction parameters.

A key recovery registration context contains no special attributes. A key recovery enablement context maintains information about the identities and profiles of the local and remote parties for a cryptographic association. When the KR-API function to create a key recovery enablement context is invoked, the identities and key recovery profiles for the specified communicating peers may be specified by the application layer code using the API parameters; however, the profile parameters are set to NULL, the profiles may be retrieved automatically from the KRPR if a match is found with the specified local and remote identities. A key recovery request context maintains a set of key recovery fields which are being used to perform a recovery request operation, and a set of flags that denotes the operational scenario of the recovery request operation. Since the establishment of a context implies the maintaining of state information within the SKMF, contexts acquired should be released as soon as their need is over.

4.3.4. Key Recovery Policy

The SKMF enforces the applicable key recovery policy on all cryptographic operations. There are two key recovery policies enforced by the SKMF, a law enforcement (E) key recovery policy, and the enterprise (ENT) key recovery policy. Since the requirements for these two mandatory key recovery scenarios are somewhat different, they are implemented by different mechanisms within the SKMF.

The law enforcement key recovery policy is predefined (based on the political jurisdictions of manufacture and use of the cryptographic product) for a given product. The parameters on which the policy decision is made are predefined as well. Thus, the LE key recovery policy is implemented using two key recovery policy tables, one table corresponding to the policy of the jurisdiction of manufacture, and the second corresponding to the jurisdiction of use of the product. These two LE policy tables are consulted by the key recovery policy enforcement function in the SKMF. The LE policy tables are implemented as two separate physical files for ease of implementation and upgrade (as law enforcement policies evolve over time); however, these files are protected u sing the same integrity mechanisms as the SKMF module, and thus have the same assurance properties.

The ENT key recovery policy, on the other hand, could vary anywhere between being set to NULL, and being very complex (e.g. based on parameters such as time of day.) Enterprises are allowed total flexibility with respect to the enterprise key recovery policy. The enterprise policy is implemented within the SKMF by invoking a key recovery policy function that is defined by the enterprise administrator. The KR-API provides a function that allows an administrator to specify the name of a file that contains the enterprise key recovery policy function. This API function allows the administrator to establish a passphrase for subsequent calls on this function. This mechanism assures a level of access control on the enterprise policy, once a policy function has been established. It goes without saying that the file containing the policy function should be protected using the maximal possible protection afforded by the operating system platform. The actual structure of the policy function file is operating system platform specific.

Every time a cryptographic context handle is returned to application layer code, the SKMF enforces the LE and ENT key recovery policies. For the LE policy, the SKMF policy enforcement function and the LE policy tables are used. For the ENT policy, the ENT policy function file is invoked in a operating system platform specific way. If the policy check determines that key recovery enablement is required for either LE or ENT scenarios, then the context is flagged as unusable, by setting specific bits of the context usability field. Otherwise, the context is flagged as usable. An unusable context handle becomes flagged as usable only after the appropriate key recovery enablement operation is completed using that context handle. A usable context handle can then be used to perform cryptographic operations.

4.3.5. Key Recovery Enablement Operations

The SKMF key recovery enablement operations comprise the generation and processing of key recovery fields. Within a cryptographic association, key recovery field generation is performed by the sending side; key recovery field processing is performed on the receiving side to ensure that the integrity of the recovery fields have been maintained in transmission between the sending and receiving sides. These two vital operations are performed via the CSSM_KR_GenerateRecoveryFields() and the CSSM_KR_ProcessRecoveryFields() functions respectively. These functions are covered summarily in a subsequent section of this chapter and in detail in Chapter 6.

The key recovery fields generated by the SKMF potentially comprises three sub-fields, for law enforcement, enterprise and individual key recovery scenarios, respectively. The law enforcement and enterprise key recovery sub-fields are generated when the law enforcement and enterprise bits of the usability field is appropriately set in the cryptographic context used to generate the key recovery fields. The individual key recovery sub-fields are generated when a certain flag value is set while invocation of the API function to generate the key recovery fields. The processing of the key recovery fields only applies to the law enforcement and enterprise key recovery sub-fields; the individual key recovery subfields are ignored by the key recovery fields processing function.

4.3.6. Key Recovery Registration and Request Operations

The SKMF also supports the operations of registration and recovery requests. The KRSP exchanges messages with the appropriate key recovery agent/server to obtain the results required. If additional inputs are required for the completion of the operation, the supplied callback may be used by the KRSP. The recovery request operation can be used to request of batch of recoverable keys. The result of the registration operation is a key recovery profile data structure, while the results of a recovery request operation are a set of recovered keys.

4.3.7. Relationship of the Key Recovery and Cryptographic Module Managers

It may be noted that the vanilla CSSM has been horizontally extended to add the KRMM. There is some degree of interdependence between the KRMM and the cryptographic module manager in a key recovery mechanism-independent way. For example, the cryptographic module manager needs to invoke the key recovery policy checking function of the KRMM, which checks the law enforcement and enterprise policies for key recovery. A cryptographic context maintained by the cryptographic module manager, will need to be made available to the KRMM, so that the relevant key recovery fields may be generated or processed. The KRMM may modify the extension fields within the cryptographic context on which it is operating; these extension fields are then checked by the encrypt and decrypt operations of the cryptographic module manager. All of the above essentially imply that between the crypto and key recovery module managers, there is a way to share objects such as cryptographic contexts and/or their handles.

The primary rationale for this architecture is that it allows the KRSPs and the CSPs to operate oblivious of one another, thus satisfying the primary goal of this architecture. The interdependencies between the crypto and key recovery operations are captured completely within the two sub-frameworks or module managers. It may be argued that this approach exposes the key recovery APIs to the protocol handler code, and that this may be undesirable; we claim that the protocol handler code will have to be key recovery aware, whether we expose the KR-API to the application or not. There are certain parameters that have to be obtained from the application level that are essential to performing key recovery enablement operations, the application will have to be modified to handle these additional parameters for key recovery. For example, in an implementation of a key recovery enabled SSL, the code would have to handle special cipher suites and cipher specs in order to negotiate a key recovery mechanism with the receiving party; so exposing the KR-API to the SSL applications does not appear to be real disadvantage. On the other hand, hiding the KRMM under the crypto module manager, or incorporating the KR mechanism into a CSP has the obvious disadvantage that the CSP needs to be modified, and needs to be cognizant of specific KR mechanisms. We conclude, therefore, that there does not appear to be any advantage to positioning the KRMM under the crypto module manager.

4.5. Key Recovery APIs
4.4.1. Key Recovery Module Management Operations CSSM_KR_SetEnterpriseRecoveryPolicy—this call establishes the filename which contains the enterprise-based key recovery policy function for use by the SKMF.

4.4.2. Key Recovery Context Operations

CSSM_KR_CreateRecoveryRegistrationContext—this call accepts as input the handle to the KRSP and returns a handle to a key recovery registration context.

CSSM_KR_CreateRecoveryEnablementContext—this call accepts as input the handle to the KRSP and the identities and key recovery profiles of the local and remote parties, and returns a handle to the key recovery context for the given parties under the key recovery mechanism specified.

CSSM_KR_CreateRecoveryRequestContext—this call accepts as input the handle to the KRSP, the key recovery fields (from which the key is to be recovered,) and the identity and profile of the local party, and returns a handle to the key recovery context for the given party and key recovery fields.

CSSM_KR_GetPolicylnfo—this call returns the key recovery policy information pertaining to a given cryptographic context.

4.4.3. Key Recovery Registration Operation

CSSM_KR_RegistrationRequest—performs a recovery registration request operation. A callback may be supplied to allow the registration operation to query for additional input information, if necessary. The result of the registration request operation is a reference handle that may be used to invoke the CSSM_KR_RegistrationRetrieve function.

CSSM_KR_RegistrationRetrieve—completes a recovery registration operation. The result of the registration operation is returned in the form of a key recovery profile.

4.4.4. Key Recovery Enablement Operations

CSSM_KR_GenerateRecoveryFields—accepts as input the key recovery context handle, the session based recovery parameters and the cryptographic context handle, and several other parameters of relevance to the KRSP, and outputs a buffer of the appropriate mechanism-specific key recovery fields in a format defined and interpreted by the specific KRSP involved. On successful completion, the input cryptographic context handlemay now be used for the encryption APIs in the cryptographic framework.

CSSM_KR_ProcessRecoveryFields—accepts as input the key recovery context handle, the cryptographic context handle, several other parameters of relevance to a KRSP, and the unparsed buffer of key recovery fields. On successful return, the input cryptographic context handle can be used for the decryption APIs in the cryptographic framework.

4.4.5. Key Recovery Request Operation

CSSM_KR_RecoveryRequest—performs a recovery request operation for one or more recoverable keys. A callback may be supplied to allow the recovery request operation to query for additional input information, if necessary. The result of the recovery request operation is a reference handle that may be used to o invoke the CSSM_KR_RecoveryRetrieve function.

CSSM_KR_Recoverytetrieve—completes a recovery request operation for one or more recoverable keys. The result of the recovery operation is a results handle that may be used to obtain each recovered key and its meta information using the CSSM_KRGetlecoveredObject function.

CSSM_KR_GetRecoveredObject—retrieves a single recoevered key and its associated meta information.

CSSM_KR_RecoveryRequestAbort—terminates a recovery operation and releases any state information associated with it.

4.6. An Example

To understand the role of key recovery in encrypted data communication, consider the following scenario (illustrated in FIG. 4.3). A communication protocol running on behalf of party A sends an encrypted message to its counterpart running on behalf of party B. To encrypt/decrypt message data, the communication protocol implementations use the SKMF APIs as follows:

A invokes the "CSSM_CSP_CreateSymmetricContext" and obtains a cryptographic context handle (HA1) representing the encryption key.

A invokes the "CSSM_Encryptata" API and provides the cryptographic context handle (HA1) as a parameter along with the message to be encrypted.

A obtains the encrypted message and sends it to B. A also sends B the data key via the key exchange mechanism. The encrypted message can be intercepted by law-enforcement agencies.

B obtains the data key from A through the key exchange mechanism and invokes the "CSSM_CSP_CreateSymmetricContext" to obtain a cryptographic context handle (HB1) representing the encryption key used by A.

B invokes the "CSSM_DecayptData" and provides the key handle (HB1) as a parameter along with the message to be decrypted.

B obtains the decrypted message sent by A.

In the above scenario, after the key handles (and keys) are destroyed there is no practical way to decipher the contents of the encrypted message A sent to B by any law-enforcement agency. If good or strong encryption is used, deciphering the encrypted message is impractical (i.e., either too expensive or impossible to decipher in usefull time). Hence, key recovery techniques must be employed.

To illustrate the use of key recovery, we modify the scenario of FIG. 4.3 to take advantage of KR-API functions, as illustrated in FIG. 4.4. The SKMF ensures that key recovery can be performed using the messages being passed between A and B as seen from the intercept point.

A invokes the "CSSM_CSP_CreateSymmetricContext" and obtains a cryptographic context handle (HA1) representing the encryption key. In contrast to the previous scenario (FIG. 4.3) where A could use the handle HA1 to encrypt the message, here, the direct use of key handle HA1 would be rejected by the "CSSM_EncryptData". The encrypt API will only accept a separate cryptographic context handle generated by the SKMF.

A invokes the "CSSM_KR_GenerateRecoveryFields" to obtain the new cryptographic context handle, HA2, that would be used for encryption. The "CSSM_KR_GenerateRecoveryFields" also generates a set of key recovery fields that are returned along with the HA2 to A. [Note that this is a simplified example. In reality, the "CSSM_KR_GenerateRecoveryFields" function requires a key recovery context handle in addition to the cryptographic context handle.]

A invokes the "CSSM_EncrypTData" and provides as parameters the cryptographic context handle (HA2), and the message to be encrypted.

A obtains the encrypted message and KR fields, and sends them to B. The data key is also sent to B using the key exchange mechanism. The encrypted message and KR fields can be intercepted by law enforcement agencies.

B retrieves the data key using the key exchange mechanism and invokes the "CSSM_CSP_CreateSymmetricContext" to obtain a cryptographic context handle (HB1) for the encryption key used by A. In contrast to the previous scenario (FIG. 4.3) where B could use the handle HB1 to decrypt the message, here the direct use of HB1 would be rejected by the decrypt operation. The decrypt will only accept a separate cryptographic context handle generated by the SKMF.

B invokes the "CSSM_KR_ProcessRecoveryFields" of the SKMF and provides the handle (HB1) as a parameter along with the KR fields to be processed. If the recovery fields process correctly, a new cryptographic context handle HB2 is returned, which B must use to decrypt the message. Note that without processing the KR fields, B could not obtain handle HB2 and, consequently, could not decrypt the message. [Note that this is a simplified example. In reality, the "CSSM_KR_ProcessRecoveryFields" function requires a key recovery context handle in addition to the cryptographic context handle.]

B invokes the "CSSM_DecryptData" and provides the handle (HB2) as a parameter along with the message to be decrypted.

B obtains the decrypted message sent by A.

law enforcement picks up the recovery fields and obtains the key used by A and B with the help of one or more trusted third parties. To do so, law enforcement must authenticate itself to the recovery service, must present the KR fields and must demonstrate that it has the legal credentials (e.g., Court warrant) for recovering the key.

The second scenario discussed above points out one of the salient features of the SKMF, namely that a key cannot be used to encrypt or decrypt a message without mediation by the SKMF. Hence, the SKMF cannot be bypassed.

5. SKMF Exportability Issues

The SKMF Toolkit contains the core SKMF architectural components, such as:

SecureWay Key Management Framework module
Key Recovery Service Provider modules
q IBM SKR KRSP
Cryptographic Service Providers modules
qCSP (using RSAs BSAFE)
qPKCS 11 standard CSP
qCCA based CSP (usable with CCA hardware tokens)
Certificate Library Modules
Trust Policy Library Modules
Data Library Modules It is envisioned that the SKMF toolkit will undergo rigorous scrutiny with respect to export controls. The SKMF toolkit is to be used by product groups to develop security enhanced applications based on the SKMF architecture. Firewalls, web browsers and web servers are some of the typical applications that may be built using the SKMF toolkit.

The goals of packaging the SKMF architectural components in the form of a toolkit are to:

qualify the SKMF toolkit for export under general license with a default set of service providers qualify service providers (that can be linked to the SKMF), for export under general license, without being part of the SKMF toolkit qualify applications written to use SKMF for export license waiver, or pro form a approval (if application provides no additional cryptographic functionality)

5.1. SKMF Packaging

There are various options in packaging the individual components of the SKMF based system. One option is to statically bundle the application layer code along with the SKMF and a set of service providers into a single exportable product package. The entire package has to undergo rigorous export compliance tests in this case.

Other options include packaging the application layer code without the SKMF or the service providers, but allowing the latter to be dynamically linked in at runtime. In this case, the application layer code undergoes minimal (if any) export compliance testing. The SKMF and a set of service providers may be bundled into a dynamic link library (DLL) with well-defined exported interfaces. This DLL has to undergo rigorous export compliance tests to ensure that whether the application layer code is well-behaved or ill-behaved, the key recovery enablement operations will occur whenever cryptographic operations are obtained by the application code.

In order to allow dynamic additions to the set of service providers plugged-in under the framework, there needs to be a way to package the service providers as separate DLLs that can be added to an existing SKMF implementations. Since these service provider DLLs may contain export regulated cryptography, they have to undergo strict export compliance testing to ensure that they can be usable only when plugged in under a export-approved SKMF implementation. The reverse authentication scheme where the service provider authenticates the SKNF before allowing itself to become usable, is implemented in all such service providers that are to be independently exportable.

5.2. Trust Policy

A system that provides key-recovery-enabled cryptographic services needs to possess a certain degree of trust. This is because the system handles critical data such as cryptographic keys, makes policy and access control decisions, establishes the validity of public key certificates, and generates and processes the key recovery fields. Since the key recovery policy that applies to a system is typically a mandatory policy within a given environment, the code that implements and enforces these operations have to be placed within a perimeter of trust. The notion of trust in this context refers to a degree of assurance that the modules that pertain to key recovery are correct in implementation, and that they are tamperproof and noncircumventable. For well-known reasons, it is desirable to minimize the perimeter of trust as much as possible.

In a non-modular and monolithic key-recovery-enabled cryptographic system, the perimeter of trust extends over the entire product. In the SKMF architecture, the perimeter of trust encompasses the framework and the service providers underneath. The framework is trusted to implement and enforce the appropriate key recovery policy (based on the jurisdictions of manufacture and installation of the product). The CSPs are trusted to perform the cryptographic operations requested of them, while the Key Recovery Service Providers are trusted to generate and process the key recovery fields relevant to a cryptographic association. If the framework and the service providers are packaged as dynamically linked modules that are used by an application, then there needs to be a chain of trust that establishes the required trust perimeter.

In the SKMF architecture, the chain of trust is established as follows:

the framework performs self-integrity checks using digital signature verification techniques the framework verifies the integrity of each service provider before attaching to it using digital signature verification techniques the service provider may optionally perform self-integrity checks the service provider may also authenticates the framework before allowing itself to be attached dynamically. This is performed using a digital-signature mechanisms that allow a service provider to authenticate to ensure that it is being used by the SKMF.

The self-integrity check of the SKMF is performed using digital signature techniques, and is illustrated in FIG. 5.1. A signed manifest accompanies a SKMF module. A signed manifest of a module X is a set of three files, X.mfT X.sf and X.dsa, that may be used to verify the integrity of the module X at runtime. When the SKMF starts operation, the disk image as well as the in-core image of the SKMF is checked for integrity against the SKMF signed manifest files. This self-integrity check of the SKMF layer code is repeated with a certain frequency by the SKMF; it may also be performed at the request of the application layer code when the latter invokes CSSM_VerifyComponents() API function.

The SKMF and its LE key recovery policy modules are packaged as distinct files for purposes of modularity and portability. However, each distinct module is accompanied by a signed manifest. The same private key is used to sign all of the modules that comprise the SKM layer code. When the SKMF becomes operational, each of these files is loaded in, after checking the signed manifest against the disk image. After load, the modules in-core image is again checked for integrity with the signed manifest. This mechanism allows the easy modularization of the various sub-components of the SKMF layer code.

Whenever the SKMF dynamically attaches to a Service Provider (SP) module—such as through the use of dynamically linked libraries (DLLs)—the SKMF verifies the integrity of the SP module before attaching it. This is illustrated in FIG. 5.2. Every dynamically loadable SP gets shipped with a signed manifest; the signed manifest is used to verify the SP module on disk. The SP is then loaded and the in-core image is verified again against the signed manifest before the SKMF starts using the SP. The signed manifests for SPs are signed using a private key which is hierarchically related to a Vendor Root public key that is embedded within the SKMF. The signed manifest includes a certificate chain that allows the SKMF to verity the public key upto the embedded root public key. The verified public key is now used to verify the signed manifest of the SP.

Whenever a service provider contains cryptographic capabilities, and is packaged as a dynamically-linkable library module, there are issues with respect to its availability to applications that are not based on the SKMF architecture. Essentially, we would like to limit the availability of such a cryptographically-capable DLL through the SKMF; this ensures that the applicable key recovery policies may be enforced by the SKMF, and the key recovery enablement functions may be performed using the KR-API. For this reason, every such SP that is packaged as a DLL must perform an authentication step with the attaching module, to ensure that it is being attached by a SKMF module. When the SP has authenticated the attached as being the SKMF, then it allows itself to become available and usable. This step is illustrated in FIG. 5.3 using a CSP as an example. The SKY invokes a SP exported function AddInAuthenticate() and passes the path to the SKMFs credentials, namely, the SKMFs signed manifest files. The SP locates the in-core image of the SKMF and verifies this image against the signed manifest of the SKMF that resides on disk. If the verification is successful, the SP then passes up its entry points to the in-core image of the SKMF using the CSSM_RegisterServices() call. On certain operating system platforms, the SKMF is verified on disk, and then loaded, and the SP then invokes the CSSM_RegisterServices() call on the newly loaded image of the SKMF. In either case, the entry points of the SP are passes up only to an untampered image of the SKMF, since this image of the SKMF is verified by the SP.

5.3. Noncircumventability of the SKMF

In the SKMF architecture, the SKMF always intercepts all connections between the application layer code and the service providers underneath. This is a very fundamental feature of the SKMF, which allows the SKMF to mediate all cryptographic operations and perform key recovery enablement operations when required. Basically, this implies that the SKMF be noncircumventable or non-bypassable. The architecture has to ensure that the application layer code cannot directly invoke the service provider interfaces without going through the framework.

Depending on the operating system environments where the SKMF based system is used, various available mechanisms are used to ensure the property of noncircumventability. If the SKMF and its underlying service providers are implemented within the operating system, then the address space separation provided by the system can be utilized to ensure that only the SKMF APIs are available as entry points for the application layer code. On the other hand, if the SKMF and its underlying service providers are packaged as separate dynamic link libraries used by the application, then the noncircumventability property is enforced by the technique illustrated in FIG. 5.4. The service provider DLLs do not possess any exported interfaces. When the service provider (such as a CSP) is attached by a process, a phase of mutual verification continues between the SKMF and the service provider until both entities are certain about the other entity, after this is completed, the service provider dynamically sends the SKMF the set of entry points for its services. Thus, for all applications that are not based on the SKMF architecture, the SP DLL in unavailable. This tight coupling mechanism ensures two basic purposes: only the SKMF can attach to the service provider DLLs, and the DLLs dynamically transmit their entry points to the attaching application only after ensuring that it is the SKMF. It may be noted that when the application layer code, the SKMF and the SPs are in the same address space, it may be possible for a persistent ha cker to determine the entry points of a SP DLL and to invoke them directly without using the SKMF APIs; however, this mode of attack is considered outside of the problem domain, since it appears that writing or obtaining cryptographic code directly is easier than attacking the SKMF architecture in this way.

5.4. SKMF Installation and Configuration

There are a number of issues with respect to the installation and configuration of a product based on the SKMF architecture. Firstly, the law enforcement KRPT is specific for the jurisdictions of manufacture, installation and use of the product; the KRPT is basically a combination of the key recovery enablement policies of each of the relevant jurisdictions. Secondly, the various components of the SKY architecture (such as the key recovery service providers, the trust policy service providers, etc.) need to be cognizant of the trust attributes for the key escrow or recovery agent certificates. The KRSP needs to be aware of the anchors of trust for KRA certificates used for each of the key recovery scenarios. The KRSP also needs to be aware of the specific TP and CL modules that are to be used to validate the KRA certificates. These pieces of information are contained in KRSP configuration files that are set at installation time.

6. The Key Recovery Application Programming Interface 6.1. Data Structures typedef unit32 CSSM_KRSP_HANDLE /* Key Recovery Service Provider Handle */

CSSM_KRSP_INFO

This data structure contains information about a Key Recovery Service Provider.

typedef struct cssm_krsp_info{unit32 VerMajor; /* Major Version Number */ unit32 VerMinor; /* Minor Version Number */ char * Vendor; /* KRSP Vendor Name */ char * Description; /* Detailed Description Field for the KRSP */ char * Jurisdiction; /* Home jurisdiction of KRSP installation */ } CSSM_KRSP_INFO, *CSSM_KRSP_INFO_PTR

CSSM_KR_NAME

This data structure contains a typed name. The namespace type specifies what kind of name is contained in the third parameter.

typedef struct cssm_kr_name {unit8 type; /* namespace type */ unit8 length; /* name string length */ char *name; /* name string */ } CSSM_KR_NAME, *CSM_KR_NAME_PTR;

CSSM_CERTGROUP

This data structure contains a set of certificates that are related based on cosignaturing. This certificate group is a syntactic representation of a trust model.

typedef struct cssm_certgroup{uint32 NumCerts; /* number of elements in CertList array */ CSSM_DATA_PTR CertList; /* List of opaque certificates */ void * reserved; } CSSM_CERTGROUP, *CSSM_CERTGROUP_PTR.

CSSM_KR_PROFILE

This data structure encapsulates the key recovery profile for a given user and a given key recovery mechanism typedef struct cssm_kr_profile {CSSM_KR_NAME UserName; /* name of the entity that is using this profile */ CSSM_DATA_PR UserCertificate /* X509v3 ASN.1 DER encoded public key certificate of the user */ CSSM_CERTGROUP_PTR KRSCertChain; /* not used for Release 1*/ uint8 LE_KRANum; /* number of KRA cert chains in the following list */ CSSM_CERTGROUP_PTR LE_KRACertChainList; /* list of Law enforcement X509v3 ASN.1 DER encoded KRA certs */ unit8 ENT_KRANum; /* number of KRA cert chains in the following list */ CSSM_CERTGROUP_PTR ENT_KRACertChainList; /* list of Enterprise X509v3 ASN.1 DER encoded KRA certs*/ uint8 INDIV_KRANum; /* number of KRA cert chains in the following list */ CSSM_CERTGROUP_PTR INDIV_KRACertChainList; /* list of Individual KRA cert chains*/ CSSM_DATA_PTR INDIV_AuthenticationInfo; /* authentication information for user recovery. For Release 1, this will contain a hashed passphrase*/ uint32 KRFlags; /* flag values to be defined and interpreted by specific KRSP */ CSSM DATA_PTR Extensions; /* reserved for extensions specific to KRSPs */ } CSSM_KR_PROFILE, *CSSM_KR PROFILE_PTR;

CSSM_CONTEXT_ATTRIBUTE Extensions

The key recovery context creation operations return key recovery context handles that are represented as cryptographic context handles. The CSSM_CONTEXT data structure has been extended to include to hold the new types of attributes, as shown below:

typedef struct cssm_context_attribute {uint32 AttributeType; /* one of the defined CSSM_ATTRIBUTE_TYPEs */ uint32 AttributeLength; /* length of attribute */ union {uint8* Description; uint32* Length; void *Pointer, CSSM_CRYPTO_DATA_PTR SeedPasshPhrase; CSSM_KEY_PTR Key; CSSM_DATA_PTR Data; CSSM_KR_PROFILE_PTR KRProfile; /* new attribute to hold KR profile */ } Attribute; /* data that describes attribute */ } CSSM CONTEXT_ATTRIBUTE, *CSSM_CONTEXT_ATTRIBUTE_PTR;

Several new attribute types were defined to support the key recovery context attributes. The CSSM_ATTRIBUTE_TYPE enum is extended as follows:

CSSM_ATTRIBUTE_KRPROFILE_LOCAL=CSSM_ATTRIBUTE_LAST+1,

CSSM_ATTRIBUTE_KRPROFILE_REMOTE=CSSM_ATTRIBUTE_LAST+2

6.2. Key Recovery Module Management Operations 6.2.1. CSSM_KR_SetEnterpriseRecoveryPolicy CSSM_RETURN CSSMAPI CSSM_KR_SeEnterpriseRecoveryPolicy ( char * RecoveryPolicyFileName, const CSSM_CRYPTO_DATA_PTR OldPassPhrase, const CSSSM_CRYPTO_DATA_PTRNewPassphrase)

Description

This call establishes the identity of the file that contains the enterprise key recovery policy function. It allows the use of a passphrase for access control to the update of the enterprise policy module. The first time this function is invoked, the old passphrase is assumed to be NULL. A passphrase can be established at this time for subsequent access control to this function. For subsequent invocations of this function, the new passphrase can be set to NULL if the passphrase does not need to be updated. If the passphrase is to be changed, both the old and new passphrases have to be supplied. The policy function module is operating system platform specific (for Win95 and NT, it is a DLL, for UNIX platforms, it is a shared library). It is expected that the policy function file will be protected using the available protection mechanisms of the operating system platform. The policy function is expected to conform to the following interface:

boolean EnterpriseRecoveryPolicy( CSSM_CONTEXT CryptoContext);

The boolean return value of this policy function will determine whether enterprise-based key recovery is mandated for the given cryptographic operation.

Parameters

RecoveryPolicyFileName (input)

A pointer to a character string which specifies the file name of the module that contains the enterprise key recovery policy function. The filename may be a fully qualified pathname or a partial pathname.

OldPassPhrase (input)

The passphrase used to control access to this operation. This should be NULL when this function is invoked for the first time.

NewPassPhrase (input)

The value of the passphrase to be established for subsequent access to this function. It should be NULL if the passphrase does not need to be updated.

Return Values

A CSSM return value. This function returns CSSM_OK if successful and returns an error code if an error has occurred.

Error Codes

TBD.

6.3. Key Recovery Context Operations

Key recovery contexts are essentially cryptographic contexts. The following API functions deal with the creation of these special types of cryptographic contexts. Once these contexts are created, the regular CSSM context API functions may be used to manipulate these key recovery contexts.

6.3.1. CSSM_KR_CreateRecoveryRegistrationContext

CSSM_CC_HANDLE CSSMAPI CSSM_KR_CreateRecoveryRegistrationContext (CSSM_KRSP_HANDLE KRSPHandle)

Description

This call creates a key recovery registration context based on a KRSP handle (which determines the key recovery mechanism that is in use). This context may be used for performing registration with key recovery servers and/or agents.

Parameters

KRSPHandle (input)

The handle to the KRSP that is to be used.

Return Values

A handle to the key recovery registration context is returned. If the handle is NULL, that signifies that an error has occurred.

Error Codes

TBD.

6.3.2. CSSM_KR_CreateRecoveryEnablementContext

CSSM_CC_HANDLE CSSMAPI CSSM_KR_CreateRecoveryEnablementContext (CSSM_KRSP_HANDLE KRSPHandle, const CSSM_KR_PROFILE LocalProfile, const CSSM_KR_PROFILE RemoteProfile)

Description

This call creates a key recovery enablement context based on a KRSP handle (which determines the key recovery mechanism that is in use), and key recovery profiles for the local and remote parties involved in a cryptographic exchange. It is expected that the LocalProfile will contain sufficient information to perform LE, ENT and IND key recovery enablement, whereas, the RemoteProfile will contain information to perform LE and ENT key recovery enablement only. However, any and all of the fields within the profiles may be set to NULL—in this case, default values for these fields are to be used when performing the recovery enablement operations.

Parameters

KRSPHandle (input)

The handle to the KRSP that is to be used.

LocalProfle (input)

The key recovery profile for the local client.

RemoteProfile (input)

The key recovery profile for the remote client.

Return Values

A handle to the key recovery enablement context is returned. If the handle is NULL, that signifies that an error has occurred.

Error Codes

TBD.

6.3.3. CSSM_KR_CreateRecoveryRequestContext

CSSM_CC_HANDLE CSSMAPI CSSM_KR_CreateRecoveryRequestContext (CSSM_KRSP_HANDLE KRSPHandle, const CSSM_KR_PROFILE LocalProfile)

Description

This call creates a key recovery request context based on a KRSP handle (which determines the key recovery mechanism that is in use), the profile for the local party and flag values to signify what kind of key recovery is desired. A handle to the key recovery request context is returned.

Parameters

KRSPHandle (input)

The handle to the KRSP that is to be used.

LocalProfile (input)

The key recovery profile for the local client. This parameter is relevant only when KRFlags is set to KR_INDV.

Return Values

A handle to the key recovery context is returned. If the handle is NULL, that signifies that an error has occurred.

Error Codes

TBD.

6.3.4. CSSM_KR_GetPolicyInfo

CSSM_RETURN CSSM_KR_GetPolicyInfo (CSSM_CC_HANDLE CCHandle, uint32* Encryption Prohibited, uint32* WorkFactor)

Description

This call returns the key recovery policy information for a given cryptographic context. The information returned constitutes the key recovery extension fields of a cryptographic context.

Parameters

CCHandle (input)

The handle to the cryptographic context that is to be used.

Encryptionlrohibited (input)

The usability field for law enforcement and enterprise key recovery. Possible values are:

KR_LE—signifies that law enforcement key recovery enablement needs to be done

KR_ENT—signifies that lenterprise key recovery enablement is required

Workfactor (output)

The maximum permissible workfactor value that may be used for law enforcement key recovery.

Return Values

A CSSM return value. This function returns CSSM_OK if successful and returns an error code if an error has occurred.

Error Codes

TBD.

6.4. Key Recovery Registration Operations 6.4.1. CSSM_KR_RegistrationRequest

CSSM_RETURN CSSMAPI CSSM_KR_RegistriornRequest(CSSM_CC_HANDLE RecoveryRegistrationContext, CSSM_DATA_PTRKRInData, CSSM_CRYPTO_DATA_PTR UserCallback, uint8 KRFlags, unit32* EstimatedTime CSSM_HANDLE_PTR ReferenceHandle)

Description

This function performs a key recovery registration operation. The KRInData contains known input parameters for the recovery registration operation. A UserCallback function may be supplied to allow the registration operation to interact with the user interface, if necessary. When this operation is successful, t a ReferenceHandle and an EstimatedTime parameter are returned; the ReferenceHandle is to be used to invoke the CSSM_KR_RegistrationRetrieve function, after the EstimatedTime in seconds.

Parameters

RecoveryRegistrationContext (input)

The handle to the key recovery registration context.

KRInData(input)

Input data for key recovery registration.

UserCallback (input)

A callback function that may be used to collect further information from the user interface.

KRFlags (input)

Flag values for recovery registration. Defined values are: KR_INDIVIDUAL—signifies that the registration is for the IND scenario KR_ENT—signifies that the registration is for the ENT scenario KR_LE—signifies that the registration is for the LE scenario EstimatedTime (output) The estimated time after which the CSSM_KR_RegistrationRetrieve call should be invoked to obtain registration results.

ReferenceHandle (output)

The handle to use to invoke the CSSM_KR_RegistrationRetrieve function. Return Values A CSSM return value. This function returns CSSM_OK if successful and returns an error code if an error has occurred.

Error Codes

TBD.

6.4.2. CSSM_KR_RegistrationRetrieve

CSSM_RETURN CSSMAPI CSSM_KR_RegistrationRetrieve(CSSM_KRSP_HANDLE hKRSP, CSSM_HANDLE ReferenceHandle, unit32* EstimatedTime, CSSM_KR_PROFILE_PTR KRProfile)

Description

This function completes a key recovery registration operation. The results of a successful registration operation are returned through the KRProfile parameter, which may be used with the profile management API functions.

If the results are not available when this function is invoked, the KRProfile parameter is set to NULL, and the EstimatedTime parameter indicates when this operation should be repeated with the same ReferenceHandle.

Parameters hKRSPe (input)

The handle to the KRSP that is to be used.

ReferenceHandle (input)

The handle to the key recovery registration request that is to be completed.

Estimatedlime (output)

The estimated time after which this call should be repeated to obtain registration results. This is set to a non-zero value only when the KRProfile parameter is NULL.

KRProfile (input/output)

Key recovery profile that is filled in by the registration operation.

Return Values

A CSSM return value. This function returns CSSM_OK if successful and returns an error code if an error has occurred.

Error Codes

TBD.

6.5. Key Recovery Enablement Operations 6.5.1. CSSM_KR_GenerateRecoveryFields

CSSM_RETURN CSSMAPI CSSM_KR_GenerateRecoveryFields (CSSM_CC_HANDLE hKRContext, CSSM_CC_HANDLE CryptoContext, CSSM_DATA_PTR KRSPOptions, uint32KRFlags, CSSM_DATA_PTR KRFields)

Description

This function generates the key recovery fields for a cryptographic association given the key recovery context, the session specific key recovery attributes, and the handle to the cryptographic context containing the key that is to be made recoverable. The session attributes and the flags are not interpreted at the SKMF layer. If this call returns successfully, the CryptoContext handle can be used for the encrypt APIs of the CSSM. The generated key recovery fields are returned as an output parameter. The KRFlags parameter may be used to fine tune the contents of the KRFields produced by this operation.

Parameters hKRContext (input)

The handle to the key recovery context for the cryptographic association.

CryptoContext (input)

The cryptographic context handle that points to the session key.

KRSPOptions (input)

The key recovery service provider specific options. These options are uninterpreted by the SKMF, but passed on to the KRSP.

KRFlags (input)

Flag values for key recovery fields generation. Defined values are:

KR_INDIV—signifies that only the individual key recovery fields should be generated, KR_ENT—signifies that only the enterprise key recovery fields should be generated KR_LE—signifies that only the law enforcement key recovery fields should be generated KR_ALL—signifies that LE, ENT and IND key recovery fields should be generated KR_OPTIMIE—signifies that performance optimization options are to be adopted by a KRSP while implementing this operation KR_DROP_WORKFACTOR—signifies that the LE portion of the key recovery fields should be generated without using the key size work factor KRFields (output)

The key recovery fields in the form of an uninterpreted data blob.

Return Values

A CSSM return value. This function returns CSSM_OK if successful and returns an error code if an error has occurred.

Error Codes

TBD.

6.5.2. CSSM_KR_ProcessRecoveryFields

CSSM_RETURN CSSMAPI CSSM_KR_ProcessRecoveryFields (CSSM_CC_HANDLE KeyRecoveryContext, CSSM_CC_HANDLE CryptoContext, CSSM_DATA_PTRKRSPOptions, uint32 KRFlags, CSSM_DATA_PTRKRFields)

Description

This call processed a set of key recovery fields given the key recovery context, and the cryptographic context for the decryption operation. If the call is successful, the CryptoContext handle may be used for the decrypt API calls of the CSSM.

Parameters

KeyRecoveryContext (input)

The handle to the key recovery context.

CryptoContext (input)

A handle to the cryptographic context for which the key recovery fields are to be processed.

KRSPOptions (input)

The key recovery service provider specific options. These options are uninterpreted by the SKMF, but passed on to the KRSP.

KRFlags (input)

Flag values for key recovery fields processing. Defined values are:

KR_ENT—signifies that only the enterprise key recovery fields should be processed KR_LE—signifies that only the law enforcement key recovery fields should be processed KR_ALL—signifies that only the enterprise key recovery fields should be KR_OPTIM—signifies that performance optimization options are to be adopted by a KRSP while implementing this operation KRFields (input)

The key recovery fields to be processed.

Return Values

A CSSM return value. This function returns CSSM_OK if successful and returns an error code if an error has occurred.

Error Codes

TBD.

6.6. Key Recovery Request Operations 6.6.1. CSSM_KR_RecoveryRequest

CSSM_RETURN CSSMAPI CSSM_KR_RecoveryRequest(CSSM_CC_HANDLE RecoveryRequestContext, CSSM_DATA_PTR KRInData, CSSM_CRYPTO_DATA_PTR UserCallback, unit32* EstimatedTime, CSSM_HANDLE_PTR ReferenceHandle,)

Description

This function performs a key recovery request operation. The KRInData contains known input parameters for the recovery request operation. A UserCallback function may be supplied to allow the recovery operation to interact with the user interface, if necessary. If the recovery request operation is successful, a ReferenceHandle and an EstimatedTime parameter is returned; the ReferenceHandle is to be used to invoke the CSSM_KR_RecoveryRetrieve function, after the EstimatedTime in seconds.

Parameters

RecoveryRequestContext (input)

The handle to the key recovery request context.

KRIrData(input)

Input data for key recovery requests. For encapsulation schemes, the key recovery fields are included in this parameter.

A callback function that may be used to collect further information from the user interface.

EstimatedTime (output)

The estimated time after which the CSSM_KR_RecoveryRetrieve call should be invoked to obtain recovery results. ReferenceHandle (output) Handle returned when recovery request is successful. This handle may be used to invoke the CSSM_KR_RecoveryRetrieve function.

Return Values

A CSSM return value. This function returns CSSM_OK if successful and returns an error code if an error has occurred.

Error Codes

TBD.

6.6.2. CSSM_KR_RecoveryRetrieve

CSSM_RETURN CSSMAPI CSSM_KR_RecoveryRetrieve( CSSM_KRSP_HANDLE KRSPHandle, CSSM_HANDLE_PTR ReferenceHandle, unit32* EstimatedTime, CSSM_HANDLE_PTR CacheHandle, unit32* NumberOf(ecoveredKeys)

Description

This function completes a key recovery request operation. The ReferenceHandle parameter indicates which outstanding recovery request is to be completed. The results of a successful recovery operation are referenced by the ResultsHandle parameter, which may be used with the CSSM_KR_GetRecoveredObject function to retrieve the recovered keys.

If the results are not available at the time this function is invoked, the CacheHandle is NULL, and the EstimatedTime parameter indicates when this operation should be repeated with the same ReferenceHandle.

Parameters

KRSPHandle (input)

The handle to the KRSP that is to be used.

ReferenceHandle (input)

Pointer to a handle that indicates which key recovery request operation is to be completed.

EstimatedTime (output)

The estimated time after which this call should be repeated to obtain recovery results. This is set to a non-zero value only when the ResultsHandle parameter is NULL.

CacheHandle (output)

Handle returned when recovery operation is successful. This handle may be used to get individual keys using the CSSM_KR_GetRecoveredObject function. This handle is NULL, if the EstimatedTime parameter is not zero.

NumberOfRecoveredKeys(output)

The number of recovered key objects that may be obtained using the ResultsHandle.

Return Values

A CSSM return value. This function returns CSSM_OK if successful and returns an error code if an error has occurred.

Error Codes 6.6.3. CSSM_KR_GetRecoveredObject

CSSM_RETURN CSSMAPI CSSM_KR_GetRecoveredObject (CSSM_KRSP_HANDLE KRSPHandle, CSSM_HANDLE_PTR CacheHandle, unit32 IndexInResults, CSSM_CSP_HANDLE CSPHandle, const CSSM_CRYPTO_DATA_PTR PassPhrase, CSSM_KEY_PTRRecoveredKey, unit32 Flags, CSSM_DATA_PTR OtherInfo)

Description

This function is used to step through the results of a recovery request operation in order to retrieve a single recovered key at a time along with its associated meta information. The cache handle returned from a successful CSSM_KR_RecoveryRetrieve operation is used. When multiple keys are recovered by a single recovery request operation, the index parameter indicates which item to retrieve through this function.

The RecoveredKey parameter serves as an input template for the key to be returned. If a private key is to be returned by this operation, the PassPhrase parameter is used to inject the private key into the CSP indicated by the RecoveredKey template; the corresponding public key is returned in the RecoveredKey parameter. Subsequently, the PassPhrase and the public key may be used to reference the private key when operations using the private key are required. The OtherInfo parameter may be used to return other meta data associated with the recovered key.

Parameters

KRSPHandle (input)

The handle to the KRSP that is to be used.

CacheHandle (input)

The handle returned from a successful CSSM_KR_RecoveryRequest operation.

IndexInResults (input)

The index into the results that are referenced by the ResultsHandle paremeter.

CSPHandle (input/optional)

This parameter identifies the CSP that the recovered key should be injected into. It may be set to NULL if the key is to be returned in raw form to the caller.

PassPhrase (input)

This parameter is only relevant if the recovered key is a private key. It is used to protect the private key when it is inserted into the CSP specified by the RecoveredKey template.

RecoveredKey (output)

This parameter returns the recovered key.

Flags (input)

Flag values relevant for recovery of a key. Possible values are: CERT_RETRIEVE—if the recovered key is a private key, return the corresponding public key certificate in the OtherInfo parameter.

OtherInfo (output)

This parameter is used if there are additional information associated with the recovered key (such as the public key certificate when recovering a private key) that is to be returned.

Return Values

A CSSM return value. This function returns CSSM_OK if successful and returns an error code if an error has occurred.

Error Codes

TBD.

6.6.4. CSSM_KR_RecoveryRequestAbort

CSSM_RETURN CSSMAPI CSSM_KR_RecoveryRequestAbort (CSSM_KR_HANDLE KRSPHandle, CSSM_HANDLE CacheHandle)

Description

This function terminates a recovery request operation and releases any state information related to the recovery request.

Parameters

KRSPHandle (input)

The handle to the KRSP that is to be used.

CacheHandle (input)

The handle returned from a successful CSSM_KR_RecoveryRequest operation.

Return Values

A CSSM return value. This function returns CSSM_OK if successful and returns an error code if an error has occurred.

Error Codes

TBD.

7. Key Recovery Service Provider Interface 7.1. Data Structures typedef uint32 CSSM_KRSP_HANDLE /* key recovery service provider handle */ typedefCSSMAPI CSSMKRSPI typedef CSSM_RETURN (*CSSM_PRIV_FUNC_PTR) (CSSM_CC_HANDLE hContext, CSSM_BOOL Priv);

See Section 6.1 for all relevant data structure definitions.

7.2. Key Recovery Registration Operations 7.2.1. KRSP_RegistrationRequest

CSSM_RETURN CSSMKRSPI KRSP_RegistrationRequest(CSSM_KRSP_HANDLE KRSPHandle, CSSM_CC_HANDLE KRRegistrationContextHandle, const CSSM_CONTEXT_PTR KRRegistrationContext, CSSM_DATA_PTR KRIiData, CSSM_CRYPTO_DATA_PTR UserCallback, unit32* EstimatedTime CSSM_HANDLE_PTR ReferenceHandle)

Description

This function performs a key recovery registration operation. The KRInData contains known input parameters for the recovery registration operation. A UserCallback function may be supplied to allow the registration operation to interact with the user interface, if necessary. When this operation is successful, a ReferenceHandle and an EstimatedTime parameter are returned; the ReferenceHandle is to be used to invoke the CSSM_KR_RegistrationRetrieve function, after the EstimatedTime in seconds.

Parameters

KRSPHandle (input)

The handle that describes the add-in key recovery service provider module used to perform up calls to CSSM for the memory functions managed by CSSM.

KRRegistrationContextHandle (input)

The handle that describes the context of this key recovery operation used to link to the KRSP-managed information.

KRRegistrationContext (input)

Pointer to CSSM_CONTEXT structure that describes the attributes with this key recovery context.

KRInData(input)

Input data for key recovery registration.

UserCallback (input)

A callback function that may be used to collect further information from the user interface.

EstimatedTime (output)

The estimated time after which the CSSM_KR_RegistrationRretrieve call should be invoked to obtain registration results.

ReferenceHandle (output)

The handle to use to invoke the CSSM_KR_RegistrationRetrieve function.

Return Values

A CSSM return value. This function returns CSSM_OK if successful and returns an error code if an error has occurred.

Error Codes

TBD.

7.2.2. KRSP_RegistrationRetrieve

CSSM_RETURN CSSMKRSPI KRSP_RegistrationRetrieve(CSSM_KRSP_HANDLE KRSPHandle, CSSM_HANDLE_PTR ReferenceHandle, unit32* EstimatedTime, CSSM_KYR_PROFILE_PTR KRProfile)

Description

This function completes a key recovery registration operation. The results of a successful registration operation are returned through the KRProfile parameter, which may be used with the profile management API functions.

If the results are not available when this function is invoked, the KRProfile parameter is set to NULL, and the EstimatedTime parameter indicates when this operation should be repeated with the same Referencelandle.

Parameters

KRSPHandle (input)

The handle that describes the add-in key recovery service provider module used to perform up calls to CSSM for the memory functions managed by CSSM.

ReferenceHandle (input)

The handle to the key recovery registration request that is to be completed.

EstimatedTime (output)

The estimated time after which this call should be repeated to obtain registration results. This is set to a non-zero value only when the KRProfile parameter is NULL.

KRProfile (input/output)

Key recovery profile that is filled in by the registration operation.

Return Values

A CSSM return value. This function returns CSSM_OK if successful and returns an error code if an error has occurred.

Error Codes

TBD.

7.3 Key Recovery Enablement Operations

7.3.1. KRSP_GenerateKRFields

CSSM_RETURN CSSMKRSPI KRSP_GenerateKRFields (CSSM_KRSP_HANDLE KRSPHandle, CSSM_CC_HANDLE KRContextHandle, const CSSM_CONTEXT_PTR KRContext, CSSM_CC_HANDLE CryptoContextHandle, const CSSM_CONTEXT_PTR CryptoContext, CSSM_DATA_PTR KRAlgAttributes, uint32 KRFlags, CSSM_DATA_PTRKRFields)

Description

This function generates the key recovery fields for a cryptographic association given the key recovery context, and the cryptographic context containing the key that is to be made recoverable. The algorithm attributes and the key recovery flags are interpreted by the KRSP. A set of key recovery fields (KRFields) is returned if the function is successful. The KRFlags parameter may be used to fine tune the contents of the KRFields produced by this operation. On successful return, the cryptographic context handle may be used with the encrypt operations of the CSSM.

Parameters

KRSPHandle (input)

The handle that describes the add-in key recovery service provider module used to perform up calls to CSSM for the memory functions managed by CSSM.

KRContextHandle (input)

The handle that describes the context of this key recovery operation used to link to the KRSP-managed information.

KRContext (input)

Pointer to CSSM_CONTEXT structure that describes the attributes with this key recovery context.

CryptoContextHandle (input)

The handle that describes the cryptographic context used to link to the CSP-managed information.

CryptoContext (input)

Pointer to CSSM_CONTEXI structure that describes the attributes of the cryptographic context.

KRAlgttributes (input)

The key recovery algorithm-specific attributes. These attributes are uninterpreted by the SKMF, but are passed on to the KRSP.

KRFlags (input)

Flag values for key recovery fields generation. Defined values are:

KR_IND—signifies that tordy the individual key recovery fields should be generated, KR_ENT—siignifies that only the enterprise key recovery fields should be generated, KR_LE—signifies that only the law enforcement key recovery fields should be generated, KR_ALL—signifies that LE, ENT, and IND key recovery fields should be generated, KR_OPTIMIZE—signifies that performance optimization options are to be adopted by a KRSP while implementing this operation KR_DROP_WORKFACTOR—signifies that the key recovery fields should be generated without using the key size work factor.

KRFields (output)

The key recovery fields in the form of a data blob.

Return Values

A CSSM return value. This function returns CSSM_OK if successful and returns an error if an error has occurred.

Error Codes

TBD.

7.3.2. KRSP_ProcessKRFields

CSSM_RETURN CSSMKRSPI KRSP_ProcessKRFields (CSSM_KRSP_HANDLE KRSPHandle, CSSM_CC_HANDLE KRContextHandle, const CSSM_CONTEXT_PTR KRContext, CSSM_CC_HANDLE CryptoContextHandle, const CSSM_CONTEXT_PTR CryptoContext, CSSM_DATA_PTRKRAlgAttributes, uint32KRFlags, CSSM_DATA_PIRKRFields)

Description

This call processes a set of key recovery fields given the key recovery context, and the cryptographic context for the decryption operation. On successful return, the cryptographic context handle may be used for the decrypt API calls of the CSSM.

Parameters

KRSPHandle (input)

The handle that describes the add-in key recovery service provider module used to perform up calls to CSSM for the memory functions managed by CSSM.

KRContextffandle (input)

The handle that describes the context of this key recovery operation used to link to the KRSP-managed information.

KRContext (input)

Pointer to CSSM_CONTEXR structure that describes the attributes with this key recovery context.

CryptoContextHandle (input)

The handle that describes the cryptographic context used to link to the CSP-managed information.

CryptoContext (input)

Pointer to CSSM_CONTEXT structure that describes the attributes of the cryptographic context.

KRAlgAttributes (input)

The key recovery algonthm-specific attributes. These attributes are uninterpreted by the SKMF, but are passed on to the KRSP.

KRFlags (input)

Flag values for key recovery fields processing. Defined values are:

KR_ENT—signifies that only the enterprise key recovery fields should be processed, KR_LE—signifies that only the law enforcement key recovery fields should be processed, KR_ALL—signifies that LE, and ENT key recovery fields should be processed, KR_OPTIMIZE—signifies that available optimization options are to be adopted.

KRFields (input)

The key recovery fields to be processed in the form of a data blob.

Return Values

A CSSM return value. This function returns CSSM_OK if the processing operation is successful and returns an error if an error has occurred.

Error Codes

TBD.

7.4. Key Recovery Request Operations 7.4.1. KRSP_RecoveryRequest

CSSM_RETURN CSSMKRSPI KRSP_RecoveryRequest(CSSM_KRSP_HANDLE KRSPHandle, CSSM_CC_HANDLE KRRequestContextHandle, const CSSM_CONTEXR_PTR KRRequestContext, CSSM_DATA_PTR KRInData, CSSM_CRYPTO_DATA_PTR UserCallback, unit32* EstiinatedTime, CSSM_HANDLE_PTR ReferenceHandle)

Description

This function performs a key recovery request operation. The KRInData contains known input parameters for the recovery request operation. A UserCallback function may be supplied to allow the recovery operation to interact with the user interface, if necessary. If the recovery request operation is successful, a ReferenceHandle and an EstimatedTime parameter is returned; the ReferenceHandle is to be used to invoke the CSSM_KR_RecoveryRetrieve function, after the Estimated Time in seconds.

Parameters

KRSPHandle (input)

The handle that describes the add-in key recovery service provider module used to perform up calls to CSSM for the memory functions managed by CSSM.

KRRequestContextHandle (input)

The handle that describes the context of this key recovery operation used to link to the KRSP-managed information.

KRRequestContext (input)

Pointer to CSSM_CONTEXT structure that describes the attributes with this key recovery context.

KRInData(input)

Input data for key recovery requests. For encapsulation schemes, the key recovery fields are included in this parameter.

UserCallback (input)

A callback function that may be used to collect further information from the user interface.

EstimatedTime (output)

The estimated time after which the CSSM_KR_RecoveryRetrieve call should be invoked to obtain recovery results.

ReferenceHandle (output)

Handle returned when recovery request is successful. This handle may be used to invoke the CSSM_KR_RecoveryRetrieve function.

NumberOffResults (output)

The number of recovered key objects that may be obtained using the ResultsHandle.

EstimatedTime (output)

The estimated time after which this call should be repeated to obtain recovery results. This is set to a non-zero value only when the ResultsHandle parameter is NULL.

Return Values

A CSSM return value. This function returns CSSM_OK if successful and returns an error code if an error has occurred.

Error Codes

TBD.

7.4.2. KRSP_RecoveryRetrieve

CSSM_RETURN CSSMKRSPI KRSP_RecoveryRetrieve(CSSM_KRSP_HANDLE KRSPHandle, CSSM_HANDLE ReferenceHandle, unit32* EstimatedTime, unit32* NumberOfResults)

Description

This function completes a key recovery request operation. The ReferenceHandle parameter indicates which outstanding recovery request is to be completed. On successfull return of this function, the results of the recovery operation are now referenced by the Referencedandle parameter, which may be used with the CSSM_KR_GetRecoveredObject function to retrieve the recovered keys one at a time.

If the results are not available at the time this function is invoked, the EstimatedTime parameter indicates when this operation should be repeated with the same ReferenceHandle.

Parameters

KRSPHandle (input)

The handle that describes the add-in key recovery service provider module used to perform up calls to CSSM for the memory functions managed by CSSM.

ReferenceHandle (input)

Handle that indicates which key recovery request operation is to be completed. On successful return of this function, this handle may be used to get individual keys using the CSSM_KR_GetRecoveredObject function.

EstimatedTime (output)

The estimated time after which this call should be repeated to obtain recovery results. This is set to a non-zero value only when the the results are not yet available, and the ReferenceHandle parameter needs to be used to repeat this call.

NumberOfResults (output)

The number of recoevered key objects that may be obtained using the ReferenceHandle.

Return Values

A CSSM return value. This function returns CSSM_OK if successful and returns an error code if an error has occurred.

Error Codes

TBD.

7.4.3. KRSP_GetRecoveredObject

CSSM_RETURN CSSMKRSPI KRSP_GetRecoveredObject (CSSM_KRSP_HANDLE KRSPHandle, CSSM_HANDLE ResultsHandle, unit32 IndexrInesults, CSSM_CRYPTO_DATA_PTR PassPhrase, CSSM_KEY_PTR RecoveredKey, uint32 Flags, CSSM_DATA_PTR OtherInfo)

Description

This function is used to step through the results of a recovery request operation in order to retrieve a single recovered key at a time along with its associated meta information. The reference handle from a successful CSSM_KR_RecoveryRetrieve operation is used as the results handle in this operation. When multiple keys are recovered by a single recovery request operation, the index parameter indicates which item to retrieve through this function.

The RecoveredKey parameter serves as an input template for the key to be returned. If a private key is to be returned by this operation, the PassPhrase parameter is used to inject the private key into the CSP indicated by the RecoveredKey template; the corresponding public key is returned in the RecoveredKey parameter. Subsequently, the PassPhrase and the public key may be used to reference the private key when operations using the private key are required. The Otherinfo parameter may be used to return other meta data associated with the recovered key.

Parameters

KRSPHandle (input)

The handle that describes the add-in key recovery service provider module used to perform up calls to CSSM for the memory functions managed by CSSM.

ResultsHandle (input)

The reference handle used in a successful CSSM_KR_RecoveryRequest operation.

IndexInResults (input)

The index into the results that are referenced by the ResultsHandle paremeter.

PassPhrase (input)

This parameter is only relevant if the recovered key is a private key. It is used to protect the private key when it is inserted into the CSP specified by the RecoveredKey template.

RecoveredKey (input/output)

This parameter serves as a template and contains the recovered key.

Flags (input)

Flag values relevant for recovery of a key. Possible values are:

CERT_RETRIEVE—if the recovered key is a private key, return the corresponding public key certificate in the Otherinfo parameter.

OtherInfo (output)

This parameter is used if there are additional information associated with the recovered key (such as the public key certificate when recovering a private key) that is to be returned.

Return Values

A CSSM return value. This function returns CSSM_OK if successful and returns an error code if an error has occurred.

Error Codes

TBD.

7.4.3. KRSP_RecoveryRequestAbort

CSSM_RETURN CSSMKSPI KRSP_RecoveryRequestAbort (CSSM_KRSP_HANDLE KRSPHandle, CSSM_HANDLE ResultsHandle)

Description

This function terminates a recovery request operation and releases any state information related to the recovery request.

Parameters

KRSPHandle (input)

The handle that describes the add-in key recovery service provider module used to perform up calls to CSSM for the memory functions managed by CSSM.

ResultsHandle (input)

The handle used in a successful CSSM_KR_RecoveryRequest operation.

Return Values

A CSSM return value. This function returns CSSM_OK if successful and returns an error code if an error has occurred.

Error Codes

TBD.

7.5. Key Recovery Privilege Operation 7.5.1. KRSP_PassPrivFunc

CSSM_RETURN CSSMKRSPI KRSP_PassPrivFunc (CSSM_PRIV_FUNC_PTR SetContextPriv)

Description

This function is to support a privileged mode of the KRSP with respect to the policies enforced by the framework. The framework uses this SPI to pass down a privileged framework entry point in the form of the SetContextPriv function. When the KRSP needs to bypass the policy enforcement performed by the framework, the KRSP uses this privileged entry point (SetContextPriv()) to make an encryption context privileged. This privileged context can be used by the KRSP and the framework will not enforce its policies on this context. As soon as the KRSP is done using the privileged context, it is expected that the KRSP will use the SetContextPriv() entry point to reset the privileged mode of the context.

Parameters

SetContextPriv (input)

The privileged entry point to the framework that can be used to set a context to a privileged mode.

Return Values

A CSSM return value. This function returns CSSM_OK if successful and returns an error code if an error has occurred.

Error Codes

TBD.

8. References

[CAPI] Microsoft Corporation, "Microsoft CryptoAPI", Version 0.9, Jan. 17, 1996.

[CDSA1] Intel Corporation, "Common Data Security Architecture Specification", Release 1.0, October 1996.

[CDSA2] Intel Corporation, "Common Security Services Manager Application Programming Interface", Draft for Release 1.2, February 1997.

[CDSA3] Intel Corporation, "Common Security Services Manager Service Provider Interface", Draft for Release 1.2, February 1997.

[DENN] Denning, Dorothy E. and Branstad, Dennis, "A Taxonomy for Key Escrow Encryption Systems", Communications of the ACM, Vol 39, No. 3, March 1996.

[MENE] Menezes, A., Van Oorschot, P., and Vanstone, S., "Handbook of Applied Cryptography", CRC Press, Inc., 1997.

[SCHN] Schneier, Bruce, "Applied Cryptography", 2nd Edition, John Wiley and Sons, Inc, 1996.

The resulting invention provides a framework based solution to key recovery for a very general purpose and open architecture that will allow the support of varied key recovery and cryptographic mechanisms.

Although a specific embodiment of the invention has been disclosed, it will be understood by those having skill in the art that changes can be made to that specific embodiment without departing from the spirit and scope of the invention.

What is claimed is:

1. A method of providing cryptographic services and key recovery services, comprising the steps of:

providing a secure key management framework including set of key recovery application program interfaces for use by an application layer code and a set of key recovery service provider interfaces to support plug-in key recovery service provider modules;

using the key recovery application program interfaces to set state and attribute information for use by the key recovery service provider modules and to generate key recovery blocks for confidentiality protected sessions;

issuing, from an application program in a computer, a request for cryptographic services;

processing said request for cryptographic services in a cryptographic module manager of the secure key management framework in said computer;

forwarding said processed request for cryptographic services from said cryptographic module manager to a cryptographic service provider program coupled to said computer;

issuing, from said application program in the computer, a request for key recovery services;

processing said request for key recovery services in a key recovery module manager of said secure key management framework in said computer; and forwarding said processed request for key recovery services from said key recovery module manager to a key recovery service provider program coupled to said computer.

2. The method of claim 1 in which said request for key recovery services is associated with said request for cryptographic services.

3. The method of claim 1 in which said step of processing said request for key recovery services in a key recovery module manager further includes the steps of:

processing said request for key recovery services in a key recovery policy table and processing said request for key recovery services in a policy enforcement module.

4. An apparatus for providing cryptographic services and key recovery services, comprising:

a secure key management framework including set of key recovery application program interfaces for use by an application layer code and a set of key recovery service provider interfaces to support plug-in key recovery service provider modules;

said key recovery application program interfaces setting state and attribute information for use by the key recovery service provider modules and generating key recovery blocks for confidentiality protected sessions;

means for issuing, from an application program in a computer, a request for cryptographic services;

means for processing said request for cryptographic services in a cryptographic module manager of the secure key management framework in said computer;

means for forwarding said processed request for cryptographic services from said cryptographic services from said cryptographic module manager to a cryptographic service provider program coupled to said computer;

means for issuing, from said application program in the computer, a request for key recovery services;

means for processing said request for key recovery services in a key recovery module manager of said secure key management framework in said computer; and means for forwarding said processed request for key recovery services from said key recovery module manager to a key recovery service provider program coupled to said computer.

5. The apparatus of claim 4 in which said request for key recovery services is associated with said request for cryptographic services.

6. The apparatus of claim 4 in which said means for processing said request for key recovery services in a key recovery module manager further includes:

means for processing said request for key recovery services in a key recovery policy table; and means for processing said request for key recovery services in a policy enforcement module.

7. An article of manufacture for use in a computer, comprising:

a computer useable medium having computer readable program code means embodied therein for providing cryptographic services and key recovery services, the computer readable program code means in said article of manufacture comprising:

computer readable program code means for providing a secure key management framework including set of key recovery application program interfaces for use by an application layer code and a set of key recovery service provider interfaces to support plug-in key recovery service provider modules;

computer readable program code means for using the key recovery application program interfaces to set state and attribute information for use by the key recovery service provider modules and to generate key recovery blocks for confidentiality protected sessions;

computer readable program code means for causing a computer to issue, from an application program in a computer, a request for cryptographic services;

computer readable program code means for causing a computer to process said request for cryptographic services in a cryptographic module manager of the secure key management framework in said computer;

computer readable program code means for causing a computer to forward said processed request for cryptographic services from said cryptographic module manager to a cryptographic service provider program coupled to said computer;

computer readable program code means for causing a computer to issue, from said application program in the computer, a request for key recovery services;

computer readable program code means for causing a computer to process said request for key recovery services in a key recovery module manager of said secure key management framework in said computer; and computer readable program code means for causing a computer to forward said processed request for key recovery services from said key recovery module manager to a key recovery service provider program coupled to said computer.

8. The article of manufacture for use in a computer, of claim 7 in which said request for key recovery services is associated with said request for cryptographic services.

9. The article of manufacture for use in a computer, of claim 7 in which said processing of said request for key recovery services in a key recovery module manager further includes:

processing said request for key recovery services in a key recovery policy table and processing said request for key recovery services in a policy enforcement module.

10. A method of providing key recovery services, comprising the steps of:

providing a secure key management framework including set of key recovery application program interfaces for use by an application layer code and a set of key recovery service provider interfaces to support plug-in key recovery service provider modules;

using the key recovery application program interfaces to set state and attribute information for use by the key recovery service provider modules and to generate key recovery blocks for confidentiality protected sessions;

issuing a request for cryptographic services;

processing said request for cryptographic services in the secure key management framework in a computer;

forwarding said processed request for cryptographic services to a cryptographic service provider program coupled to said computer;

issuing a request for key recovery services;

processing said request for key recovery services in said secure key management framework in said computer; and forwarding said processed request for key recovery services to a key recovery service provider program coupled to said computer.

11. A method of providing cryptographic key recovery services, comprising the steps of:

providing a secure key management framework including set of key recovery application program interfaces for use by an application layer code and a set of key recovery service provider interfaces to support plug-in key recovery service provider modules;

using the key recovery application program interfaces to set state and attribute information for use by the key recovery service provider modules and to generate key recovery blocks for confidentiality protected sessions;

issuing, from an application program in a computer, a request for key recovery services;

processing said request for key recovery services in a key recovery module manager of the secure key management framework in said computer; and forwarding said processed request for key recovery services from said key recovery module manager to a key recovery service provider program coupled to said computer.

12. The method of claim 11 in which said step of processing said request for key recovery services in a key recovery module manager further includes the steps of:

processing said request for key recovery services in a key recovery policy table and processing said request for key recovery services in a policy enforcement module.

13. The method of claim 11 in which said step of processing said request for key recovery services in a key recovery module manager further comprises:

said key recovery module manager supporting a set of key recovery APIs (KR-APIs) for use by application layer code;

said KR-APIs being used to set state and attribute information for use by key recovery service providers and to generate and validate the key recovery blocks for confidentiality protected sessions.

14. The method of claim 11 in which said step of processing said request for key recovery services in a key recovery module manager further comprises:

said key recovery module manager supporting a set of key recovery SPIs (KR-SPIs) to support plug-in key recovery service provider modules.

15. The method of claim 11 in which said step of processing said request for key recovery services in a key recovery module manager further comprises:

said key recovery module manager including a static key recovery enablement policy table and an enforcement module that ensures that all cryptographic associations abide by the key recovery enablement policy.

* * * * *